US012513706B2

(12) United States Patent
Mukherjee

(10) Patent No.: US 12,513,706 B2
(45) Date of Patent: Dec. 30, 2025

(54) METHODS AND APPARATUS FOR SUPPORTING SIDELINK CHANNEL SHARING IN UNLICENSED SPECTRUM

(71) Applicant: Charter Communications Operating, LLC, St. Louis, MO (US)

(72) Inventor: Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 349 days.

(21) Appl. No.: 17/990,217

(22) Filed: Nov. 18, 2022

(65) Prior Publication Data

US 2024/0172238 A1   May 23, 2024

(51) Int. Cl.
*H04W 72/23*  (2023.01)
*H04W 16/14*  (2009.01)
*H04W 72/20*  (2023.01)

(52) U.S. Cl.
CPC .......... *H04W 72/23* (2023.01); *H04W 16/14* (2013.01); *H04W 72/20* (2023.01)

(58) Field of Classification Search
CPC ..... H04W 72/23; H04W 16/14; H04W 72/20; H04W 92/18; H04W 72/25; H04W 74/0808; H04W 74/0816; H04W 88/06; H04W 72/1263
See application file for complete search history.

(56) References Cited

U.S. PATENT DOCUMENTS

| | | | |
|---|---|---|---|
| 2019/0090218 A1* | 3/2019 | Noh | H04W 88/06 |
| 2019/0208540 A1* | 7/2019 | Kim | H04W 74/0816 |
| 2020/0045738 A1* | 2/2020 | Oh | H04W 72/1263 |
| 2020/0374861 A1 | 11/2020 | Shilov et al. | |
| 2021/0219268 A1 | 7/2021 | Li et al. | |
| 2021/0298075 A1 | 9/2021 | Talarico et al. | |

(Continued)

OTHER PUBLICATIONS

3rd Generation Partnership Project; Technical Specification Group Radio Access Network; NR; Multiplexing and channel coding (Release 16), 3GPP TS 38.212 V16.6.0, Jun. 2021, 153 pages.

(Continued)

*Primary Examiner* — Kiet Tang
(74) *Attorney, Agent, or Firm* — Straub & Straub; Michael P. Straub; Stephen T. Straub

(57) ABSTRACT

A first wireless communications device, e.g., a first UE, shares a second portion, e.g., a remaining unused portion, of its sidelink (SL) channel occupancy time (COT), corresponding to unlicensed spectrum, with a second wireless communications device. The first wireless communications device communicates SL COT sharing information to the second wireless communications device via sidelink control information (SCI) communicated over physical sidelink control channel (PSCCH) resources during a first portion of its SL COT. In some embodiments, the SL COT sharing information includes one or more of: i) a channel access priority class value, ii) a COT-sharing indicator value, or iii) a COT duration field value. The SL COT sharing information allows the second wireless communications device to identify the second portion of the COT, which the second wireless communications device is allowed to use for reverse transmission to the first wireless communications.

20 Claims, 12 Drawing Sheets

(56) References Cited

U.S. PATENT DOCUMENTS

| | | | |
|---|---|---|---|
| 2022/0272750 | A1 | 8/2022 | Chisci et al. |
| 2022/0279579 | A1 | 9/2022 | He et al. |
| 2023/0209555 | A1 | 6/2023 | Sosnin et al. |
| 2023/0344563 | A1 | 10/2023 | Huang et al. |
| 2024/0406982 | A1 | 12/2024 | Ganesan et al. |
| 2025/0168878 | A1 | 5/2025 | Huang et al. |
| 2025/0220691 | A1 | 7/2025 | Lin |
| 2025/0261214 | A1 | 8/2025 | Zhou et al. |
| 2025/0267704 | A1 | 8/2025 | Noh et al. |

OTHER PUBLICATIONS

3rd Generation Partnership Project; Technical Specification Group Radio Access Network; Evolved Universal Terrestrial Radio Access (E-UTRA); LAA/eLAA for the "CBRS" 3.5GHz band in the United States (Release 15), 3GPP TR 36.790 V15.0.0, Dec. 2017, 31 pages.

3rd Generation Partnership Project; Technical Specification Group Radio Access Network; Base Station (BS) requirements and conformance tests for shared spectrum channel access (Release 15), 3GPP TS 37.107 V15.4.0, Dec. 2020, 10 pages.

Mehdi Harounabadi, Dariush Mohammad Soleymani, Shubhangi Bhadauria, Martin Leyh, and Elke Roth-Mandutz, V2X in 3GPP Standardization: NR Sidelink in Release-16 and Beyond, Vehicular Networking, IEEE Communications Standards Magazine, Mar. 2021, pp. 12-21.

\* cited by examiner

| FIGURE 2A |
|---|
| FIGURE 2B |
| FIGURE 2C |

FIGURE 2

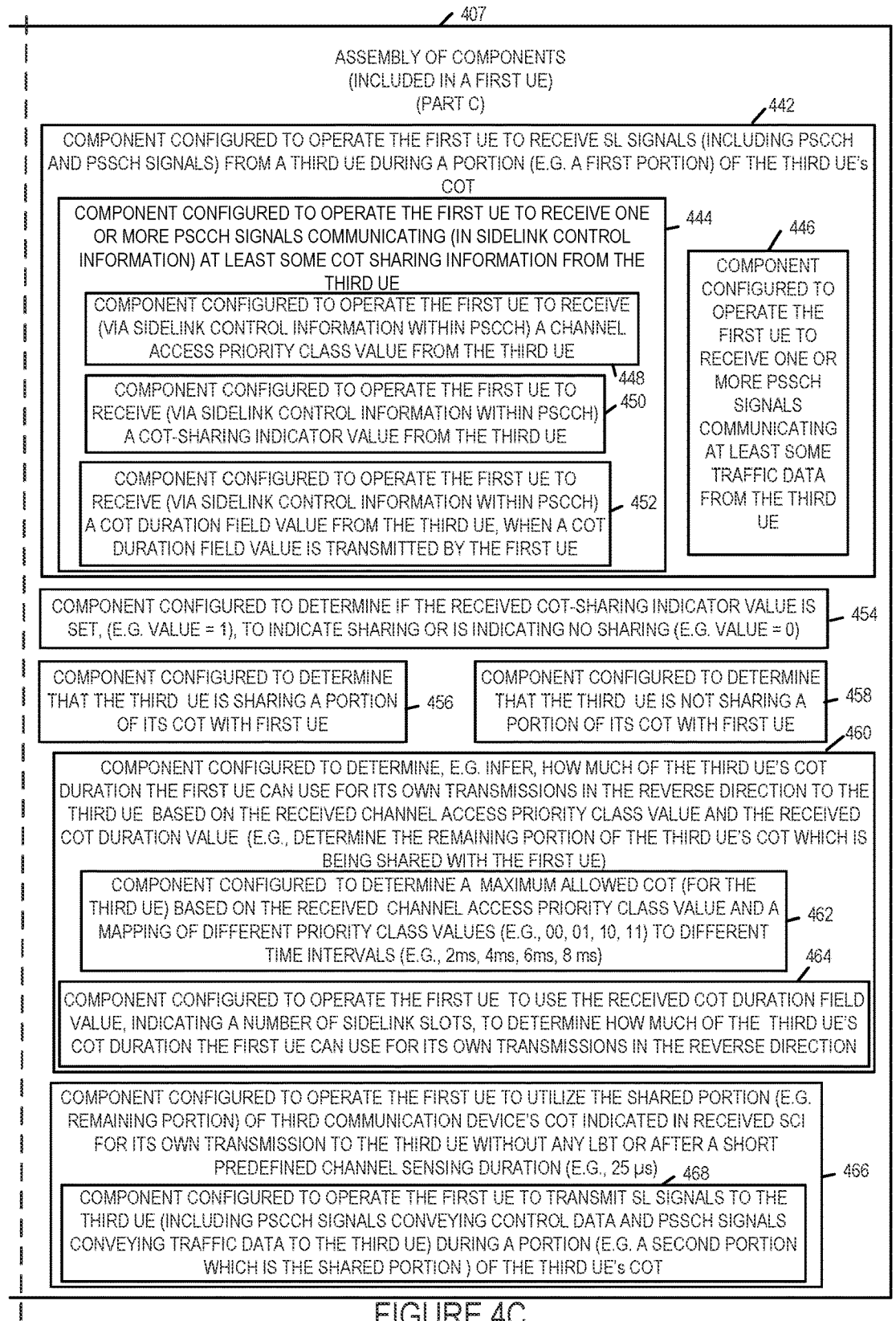

METHODS AND APPARATUS FOR SUPPORTING SIDELINK CHANNEL SHARING IN UNLICENSED SPECTRUM

FIELD

The present application relates to communications and, more particularly, to methods and apparatus for supporting sidelink channel sharing and efficient operation in unlicensed spectrum.

BACKGROUND

Channel access mechanisms were introduced in 3rd Generation Partnership Project (3GPP) Releases 13-15 for Long-Term Evolution (LTE) Licensed Assisted Access (LAA) and its enhancements enhanced LAA/further enhanced LAA (eLAA/FeLAA) that specified downlink (DL) and uplink (UL) LTE operation in unlicensed spectrum, primarily 5 GHz. The channel access schemes are similar to carrier sense multiple access with collision avoidance (CSMA/CA_ and Enhanced Distributed Channel Access (EDCA) channel access used in IEEE 802.11ac/ax.

Closely related channel access schemes were introduced in Release 16 for 5G New Radio in unlicensed spectrum (NR-U) for operation in 5 GHz and 6 GHz unlicensed spectrum.

In both LTE LAA and NR-U, DL and UL channel access for shared data channels (physical downlink shared channel (PDSCH), physical uplink shared channel (PUSCH)) employ a random backoff for channel sensing prior to transmission. The backoff is drawn from a binary exponential contention window (CW). The contention window size has a minimum limit CWmin and a maximum limit CWmax.

On the DL, for LTE LAA the CW is reset to CWmin if at least 80% of the Hybrid Automatic Repeat Request (HARQ) acknowledgment (ACK) feedback bits for the last PDSCH subframe were ACKs. For NR-U, reset if at least one HARQ-ACK feedback is 'ACK' for PDSCH(s) with transport block based feedback or at least 10% of HARQ-ACK feedbacks is 'ACK' for PDSCH code clock group (CBGs) transmitted at least partially on the channel with code block group based feedback. Otherwise, the CW is doubled to the next feasible value with CWmax as the maximum possible value.

On the UL, the CW is reset to CWmin for LAA LTE if the New Data Indicator (NDI) bit is toggled in a UL scheduling Downlink Control Information (DCI) or autonomous UL downlink feedback indication (AUL-DFI) indicates an ACK for PUSCH. For NR-U UL, reset if at least one implicit or explicit HARQ-ACK feedback is 'ACK' for PUSCH(s) with transport block (TB) based feedback or at least 10% of HARQ-ACK feedbacks are 'ACK' for PUSCH CBGs transmitted at least partially on the channel with code block group (CBG) based feedback. Otherwise, the CW is doubled to the next feasible value with CWmax as the maximum possible value.

After initiating a channel occupancy (CO), with regard to a DL channel or an UL channel, with random backoff listen-before-talk (LBT), the gNB or UE can share the CO with another device that accesses the channel either without performing any LBT or performs a fixed-duration LBT.

In Rel-18, the extension of NR sidelink (SL) operation to unlicensed spectrum (SL-U) in 5 GHz and 6 G Hz will be studied. SL has multiple peer-to-peer communication modes between two or more UEs, unlike DL and UL communication modes between a base station and a UE.

SL was introduced in Rel-16 for vehicle-to-everything (V2X) scenarios and enhanced further in Rel-17. SL supports unicast, multicast (groupcast), and broadcast modes. A separate set of NR reference and physical channels have been introduced for SL operation. (See M. Harounabadi, D. M. Soleymani, S. Bhadauria, M. Leyh and E. Roth-Mandutz, "V2X in 3GPP Standardization: NR Sidelink in Release-16 and Beyond," IEEE Communications Standards Magazine, vol. 5, no. 1, pp. 12-21, March 2021, doi: 10.1109/MCOMSTD.001.2000070) which is hereby expressly incorporated by reference). The set of NR reference and physical channels for SL operation include a Physical Sidelink Broadcast Channel (PSBCH), a Physical Sidelink Feedback Channel (PSFCH), a Physical Sidelink Shared Channel (PSSCH) and a Physical Sidelink Control Channel (PSCCH).

Physical Sidelink Broadcast Channel (PSBCH) is for the SL-BCH transport channel where the Master Information Block (MIB) for SL is sent periodically (each 160 ms) and comprises system information for UE-to-UE communication (e.g., SL TDD configuration, in-coverage flag). PSBCH is transmitted along with the Sidelink Primary Synchronization Signal/Sidelink Secondary Synchronization Signal (S-PSS/SSS) in the S-SSB (see synchronization signals).

Physical Sidelink Feedback Channel (PSFCH) is for HARQ feedback from a receiver UE to the transmitter UE on the SL for a unicast r groupcast communication. There is no HARQ feedback for broadcast mode.

Physical Sidelink Shared Channel (PSSCH) is for user plane data, and Physical Sidelink Control Channel (PSCCH) is for scheduling and resource allocation.

Resource pools are defined for SL, where a resource pool limits the radio resources used for PSCCH and PSSCH since they cannot be transmitted in all Resource Blocks (RBs) and slots of NR.

Two modes of resource allocation are specified in NR-SL Mode 1: resources are allocated by a gNB for in-coverage user equipments (UEs); Mode 2: autonomous resource selection by a user equipment (UE) based on a sensing procedure when out-of-coverage for gNBs. In Mode 1, a UE can send PSSCH acknowledgment/negative acknowledgment (ACK/NACK) feedback on the UL to the gNB (See TS 38.212 V16.6.0 (2021-06) NR; Multiplexing and channel coding (Release 16) which is hereby expressly incorporated by reference).

In Mode 2 resource selection by a UE, the sensing takes place in a pre-configured resource pool. UEs can select resources for transmission and re-transmission if the resources are not in use by other UEs with higher priority traffic. A UE, which performs sensing, measures the sidelink reference signal received power (SL-RSRP) of either PSCCH or PSSCH (See M. Harounabadi, D. M. Soleymani, S. Bhadauria, M. Leyh and E. Roth-Mandutz, "V2X in 3GPP Standardization: NR Sidelink in Release-16 and Beyond," IEEE Communications Standards Magazine, vol. 5, no. 1, pp. 12-21, March 2021, doi: 10.1109/MCOM-STD.001.2000070).

The UE considers its recent sensing results between 1100 ms and 100 ms prior to the trigger time for resource selection (e.g., due to transport block arrival). The 1100 ms sensing window is beneficial to identify the reserved resources by other UEs for periodic traffic, which are sent in the 1st stage sidelink control information (SCI) on PSCCH (See TS 38.212 V16.6.0 (2021-06) NR; Multiplexing and channel coding (Release 16)).

The UE excludes the resources where the measured RSRP is higher than a threshold and considers them as occupied if the traffic priority in the measured resources is higher than its traffic priority. Otherwise, the UE may select the occupied resource if it has higher priority traffic.

The extension of NR SL operation to unlicensed spectrum in 5 GHz and 6 GHz in Rel-18 requires that the channel access or listen-before-talk (LBT) mechanisms of SL-U and NR-U/WiFi be aligned for fair coexistence in the same spectrum. A first UE, having an acquired channel occupancy time (COT) for SL-U resources, for communications with a second UE may not need to use its full COT, e.g., because it does not have enough traffic data to communicate to the second UE. It would be beneficial if there were available structures to support sharing of its SL COT with the second UE, so that the unused (e.g., remaining) SL resources were not left unused and wasted.

Based on the above discussion there is a need for new methods and apparatus for efficient sidelink (SL) channel sharing when operating in using unlicensed spectrum.

SUMMARY

Various methods and apparatus are directed to new sidelink-unlicensed (SL-U) channel access mechanisms that are aligned with existing New Radio-Unlicensed (NR-U) Listen-Before-Talk (LBT) methods that were established in Rel-16.

Various methods and apparatus, in accordance with the present invention are directed to how a wireless communications device, e.g., a user equipment (UE), can share its sidelink (SL) channel occupancy time (COT) with another SL wireless communications device, e.g., another UE. In some embodiments, a first UE, initiates a COT with a random backoff listen-before-talk (LBT) followed by physical Sidelink Shared Channel/Physical Sidelink Control Channel (PSSCH/PSCCH) transmissions, and a receiving UE, e.g., a second UE, then initiates a second set of PSSCH/PSCCH transmissions in the reverse direction without any LBT or with a short, predefined channel sensing duration, e.g., 25 µs. The PSCCH transmitted by the first UE conveys novel COT sharing information, which is used by the second UE to determine what portion of the first UE's COT is being shared with the second UE. In some embodiments, in accordance with a feature of some embodiments of the present invention, the 1st-stage sidelink control information (SCI) on Physical Sidelink Control Channel (PSCCH) includes novel COT sharing information including: a channel access priority class (e.g., 2 bits), a COT-sharing indicator field (e.g., 1 bit), and a COT duration field in number of sidelinks slots (e.g., 5 bits). The inclusion of this novel COT sharing information in SCI is an expansion over the existing set of SCI information (See TS 38.212 V16.6.0 (2021-06) NR: Multiplexing and channel coding (Release 16)). The inclusion of this novel COT sharing information in SCI facilitates sidelink COT sharing in an efficient manner, e.g., with low overhead. The sharing of a portion of a first UE's SL COT allows for UEs to efficiently (e.g., more fully) utilize the available sidelink resources, e.g., minimizing waste, by allowing sharing of unused SL resources corresponding to a portion of the first UE's COT, which might otherwise go unused (e.g., because the first UE does not enough traffic data to fill the entire COT) and be wasted. In addition, the second UE, which receives the shared COT SL resources is allowed to quickly respond to the first UE without having to perform a random backoff LBT, thus reducing overhead, and providing for a rapid exchange of information including traffic data between the two UEs.

An exemplary method of operating a first communications device, e.g., a first user equipment (UE), in accordance with some embodiments, comprises: determining channel occupancy time (COT) sharing information including at least one of: i) a channel access priority class value or ii) a COT duration value; and transmitting one or more physical sidelink control channel (PSCCH) signals to a second communications device, e.g., a second UE, communicating at least some of the determined COT sharing information. An exemplary first communications device, e.g., a first UE, in accordance with some embodiments, comprises: a wireless transmitter; and a processor configured to: determine channel occupancy time (COT) sharing information including at least one of: i) a channel access priority class value or ii) a COT duration value; and operate the first communications device to transmit one or more physical sidelink control channel (PSCCH) signals to a second communications device, e.g., a second UE, communicating at least some of the determined COT sharing information.

Numerous variations on the described methods and apparatus are possible and while several embodiments are described in detail it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 2 comprises the combination of FIG. 2A, FIG. 2B and FIG. 2C.

FIG. 4C is a third part of an exemplary assembly of components, which may be included in a communications device in accordance with an exemplary embodiment.

FIG. 4 comprises the combination of FIG. 4A, FIG. 4B and FIG. 4C.

DETAILED DESCRIPTION

Figure 1:
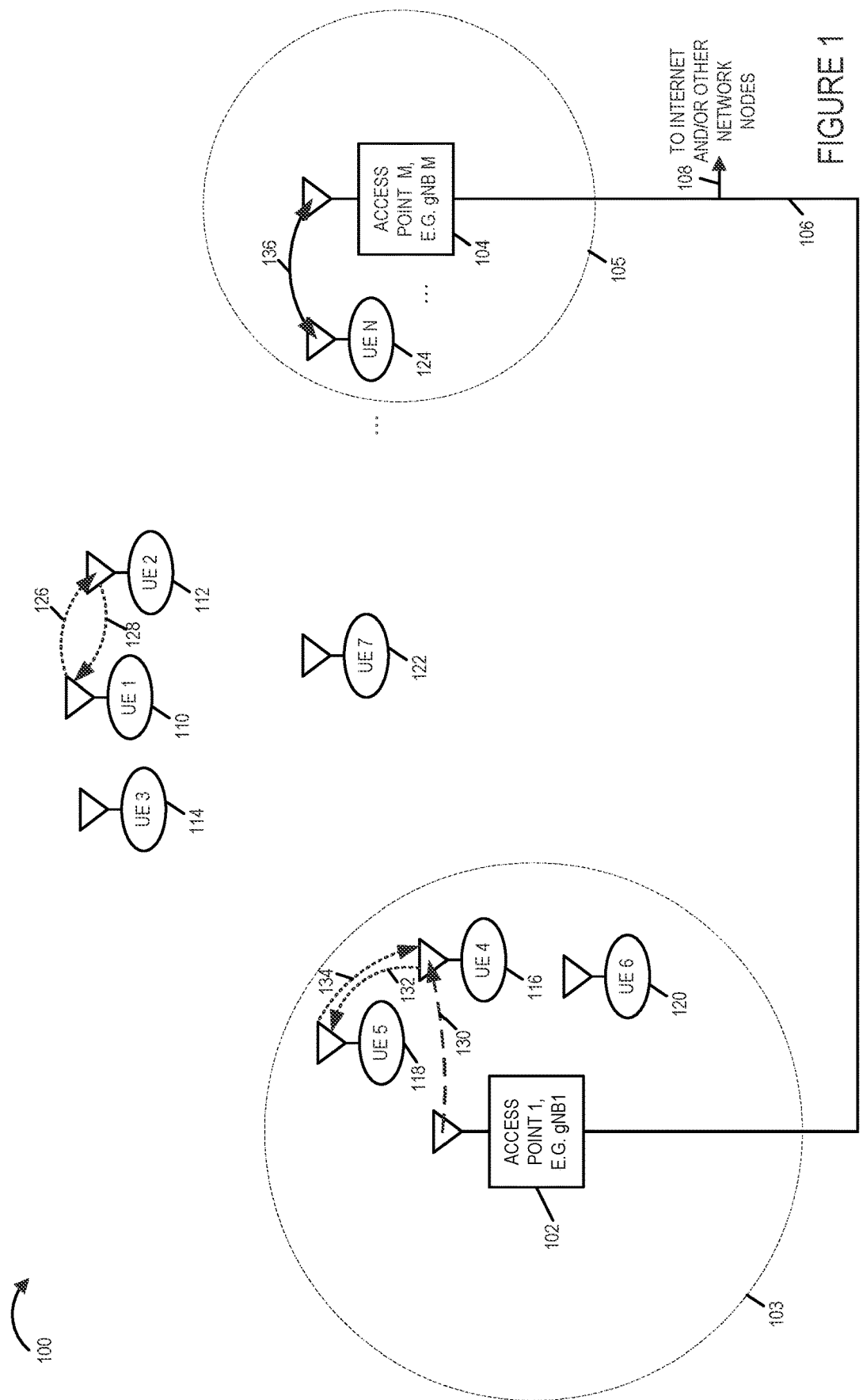
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a plurality of access points (access point 1 102, e.g., gNB 1, . . . , access point M, e.g., gNB M 104), each with a corresponding wireless coverage area (access point 1 coverage area 103, . . . , access point M coverage area 105), respectively. The access points (102, 104) are coupled together via backhaul network 106, and/or coupled to the Internet and/or other network nodes via connection 108. Exemplary communications system 100 further includes a plurality of user equipments (UE 1 110, UE 2 112, UE 3 114, UE 4 116, UE 5 118, UE6 120, UE 7 122, . . . , UE N 124), which support sidelink communications in unlicensed spectrum, and are implemented in accordance with the present invention, e.g., support sharing of channel occupancy time using methods in accordance with the present invention. At least some of the UEs (UE 1 110, UE 2 112, UE 3 114, UE 4 116, UE 5 118, UE6 120, UE 7 122, . . . , UE N 124) are mobile communications devices, which may move throughout system 100.

Consider that UEs (UE 1 110, UE 2 112, UE 3 114 and UE 7 122), which are out-of-coverage with regard to the gNBs (102, 104) are using a NR SL-mode 2 resource selection (autonomous resource selection). Further consider that UEs (UE 4 116, UE 5 118, UE 6 120 and UE N 124), which are located within the coverage area (103, 103, 103, 105) of a gNB (102, 102, 102, 104), respectively, use a NR SL-mode 1 resource selection (resources allocated by gNB).

Consider that UE 1 110, which is outside the coverage area of gNBs (102, 104) has performed an autonomous resource selection, and selected a sidelink channel to use. Further consider that UE 1 110, has successfully performed a LBT on the self-allocated sidelink channel, and has initiated a channel occupancy time (COT) with a duration corresponding to a channel access priority class. Further consider that UE 1 110 does not need to use the entire COT and intends to allocate a portion of its COT to UE 2 112. Arrow 126 represents sidelink signals, including PSCCH signals (communicating sidelink control information (SCI)) and PSSCH signals (communicating traffic data), being transmitted, during a first portion of UE 1's channel occupancy time on unlicensed spectrum, by UE 1 110 to UE 2 112. The SCI conveyed by the PSCCH signals includes channel occupancy time (COT) sharing information, in accordance with a feature of the present invention, including: i) a channel access priority class field value, ii) a COT-sharing indicator value, and iii) a COT duration field value. UE 2 112 receives the sidelink signals 126 from UE 1 110 and recovers the communicated information including the COT sharing information and the traffic data. From the COT sharing information, UE 2 112 determines that UE 1 110 is sharing its COT with UE 2 112, and UE 2 112 determines how much of the remaining COT duration UE 2 112 can use for its own transmission in the reverse direction (UE 2→UE 1 direction). Arrow 128 represents sidelink signals, including PSCCH signals (communicating sidelink control information) and PSSCH signals (communicating traffic data), being transmitted, during a second portion of UE 1's channel occupancy time on unlicensed spectrum, by UE 2 112 to UE 1 110. Note that the transmission of sidelink signals from UE 2 112 to UE 1 110 is without any LBT (e.g., UE 2's transmission of sidelink signals on the sidelink channel during the second portion of the COT, immediately follows UE 1's transmission of sidelink signals to UE 2 118 during the first portion of the COT on the sidelink channel) or is after a short pre-defined sensing duration, e.g., 25 micro-sec. Thus, there is an efficient peer to peer exchange between UE 1 110 and UE 112, e.g., including traffic data in both directions with a minimal amount of overhead being used for LBT operations and a minimum amount of unused or underutilized COT resources, e.g., due to implemented COT sharing in accordance with the present invention.

Arrow 130 represents a sidelink resource allocation, e.g., a conditional sidelink resource allocation (e.g., conditional upon the channel being free with respect to higher priority devices), from gNB 1 102 to UE 4 116. Consider that UE 4 116, has successfully performed a LBT on the allocated sidelink channel, and has initiated a channel occupancy time (COT) with a duration corresponding to a channel access priority class. Further consider that UE 4 116 does not need to use the entire COT and intends to allocate a portion of its COT to UE 5 134. Arrow 132 represents sidelink signals, including PSCCH signals (communicating sidelink control information (SCI)) and PSSCH signals (communicating traffic data), being transmitted, during a first portion of UE 4's channel occupancy time on unlicensed spectrum, by UE 4 116 to UE 5 118. The SCI conveyed by the PSCCH signals includes channel occupancy time (COT) sharing information, in accordance with a feature of the present invention, including: i) a channel access priority class field value, ii) a COT-sharing indicator value, and iii) a COT duration field value. UE 5 118 receives the sidelink signals from UE 4 116 and recovers the communicated information including the COT sharing information and the traffic data. From the COT sharing information, UE 5 118 determines that UE 4 is sharing its COT with UE 5 118, and UE 5 118 determines how much of the remaining COT duration UE 5 118 can use for its own transmission in the reverse direction (UE 5→UE 4 direction). Arrow 134 represents sidelink signals, including PSCCH signals (communicating sidelink control information) and PSSCH signals (communicating traffic data), being transmitted, during a second portion of UE 4's channel occupancy time on unlicensed spectrum, by UE 5 118 to UE 4 116. Note that the transmission from UE 5 118 to UE 4 116 is without any LBT (e.g., UE 5's transmission of sidelink signals over the sidelink channel during the second portion of the COT immediately follows UE 4's transmission of sidelink signals to UE 5 118 over the sidelink channel during the first portion of the COT) or is after a short pre-defined sensing duration, e.g., 25 micro-sec. Thus, there is an efficient peer to peer exchange between UE 4 116 and UE 5 118, e.g., including traffic data in both directions with a minimal amount of overhead being used for LBT operations and a minimum amount of unused or underutilized COT resources, e.g., due to implemented COT sharing in accordance with the present invention.

Bi-directional arrow 136 represents wireless communications signaling between gNB M 104 and UE N 132, which may, and sometimes does, include communications in an unlicensed spectrum.

Figure 2A:
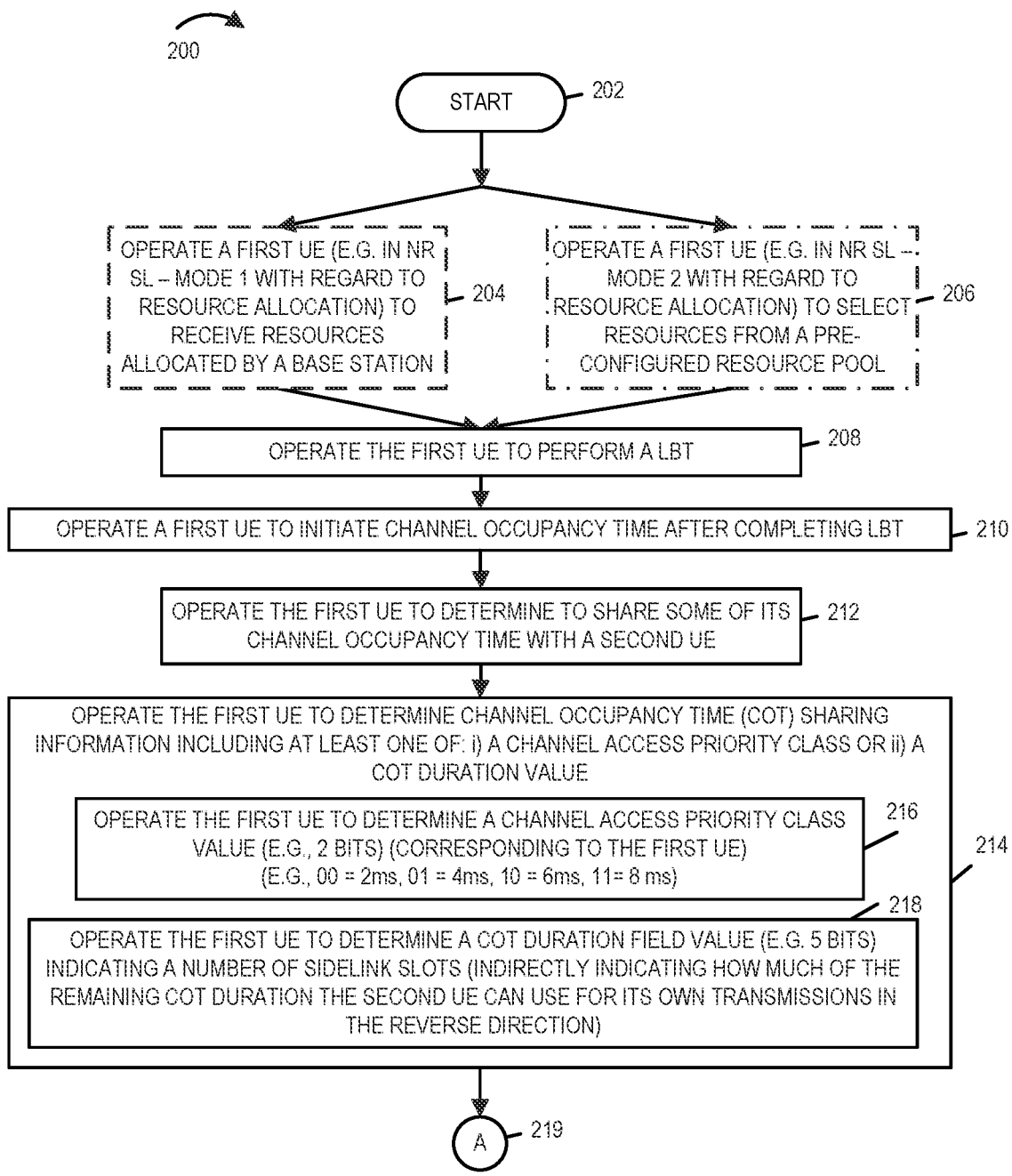
FIG. 2A is a first part of a flowchart of an exemplary method of operating a communications device, e.g., a user equipment (UE) supporting sidelink communications in unlicensed spectrum, in accordance with an exemplary embodiment.
Figure 2B:
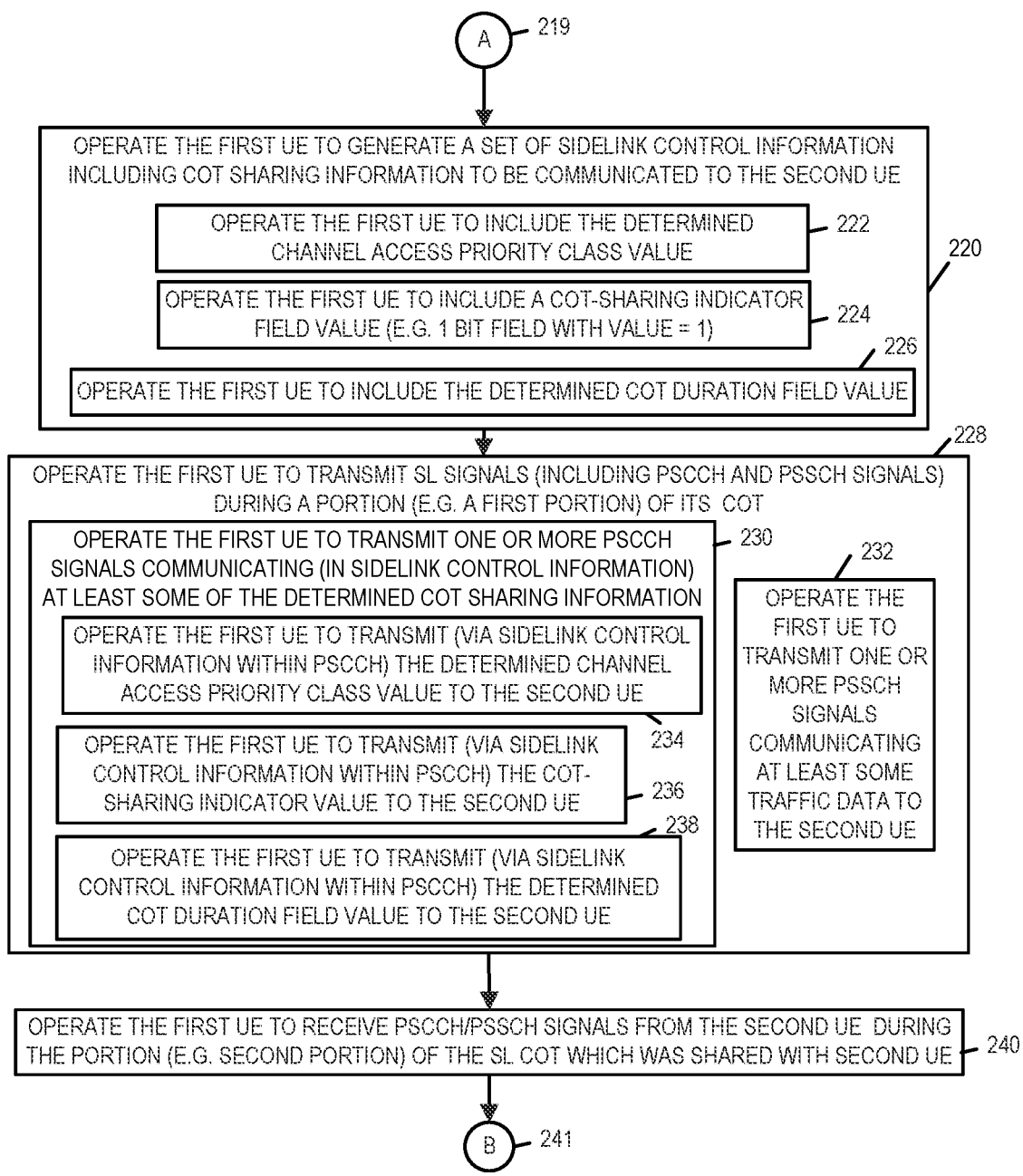
FIG. 2B is a second part of a flowchart of an exemplary method of operating a communications device, e.g., a user equipment (UE) supporting sidelink communications in unlicensed spectrum, in accordance with an exemplary embodiment.
Figure 2C:
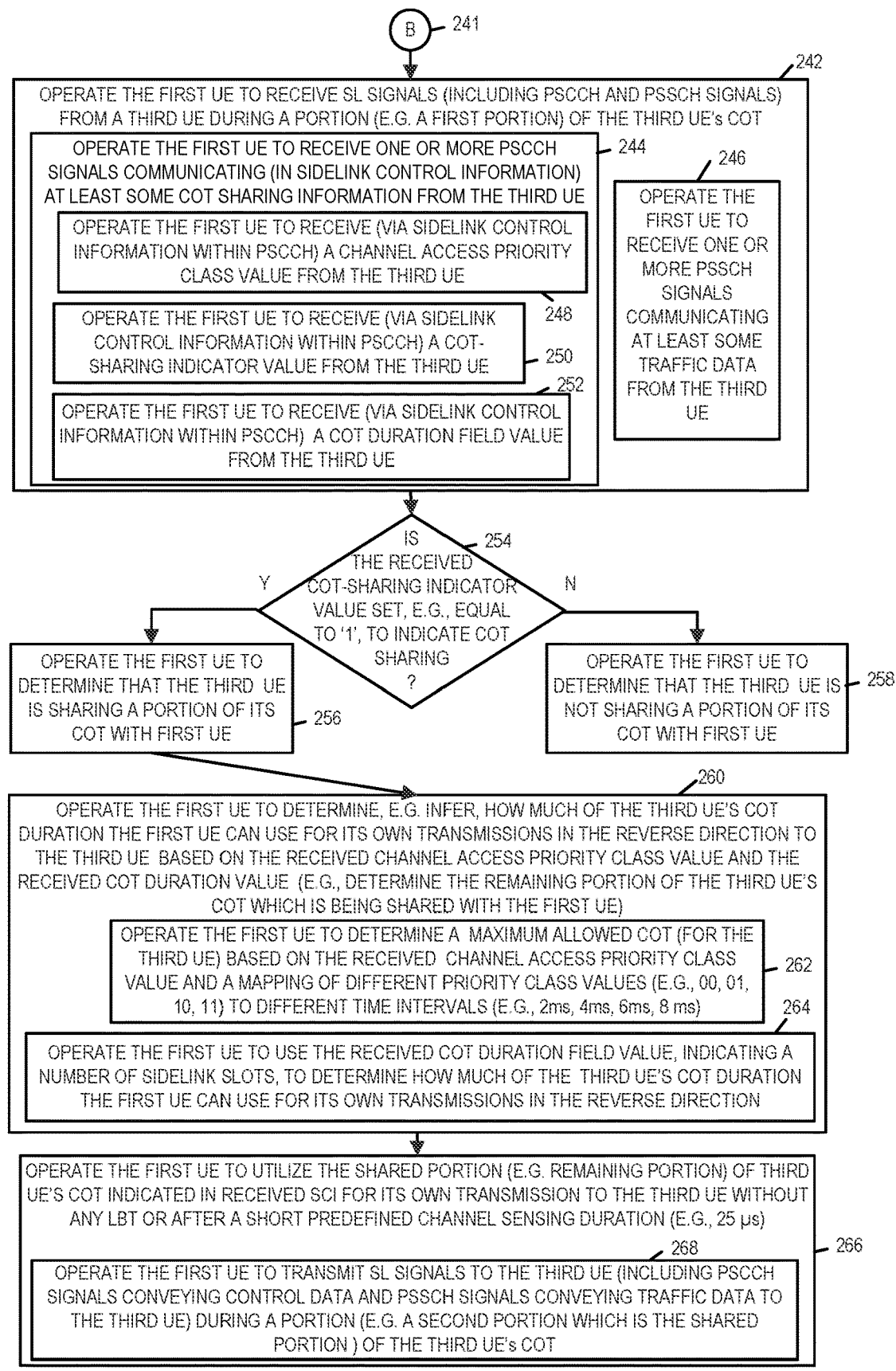
FIG. 2C is a third part of a flowchart of an exemplary method of operating a communications device, e.g., a user equipment (UE) supporting sidelink communications in unlicensed spectrum, in accordance with an exemplary embodiment.

FIG. 2, comprising the combination of FIG. 2A, FIG. 2B and FIG. 2C, is a flowchart 200 of an exemplary method of operating a first communications device, e.g., a first user equipment (UE) supporting sidelink communications in unlicensed spectrum and supporting channel occupancy sharing, in accordance with an exemplary embodiment. The flowchart of The first communications device implementing the method of flowchart 200 is, e.g., one of the UEs (UE 1 110, UE 2 112, UE 3 114, UE 4 116, UE 5 118, UE 6 120, UE 7 122, . . . , UE N 124) of system 100 of FIG. 1. FIG. 2 will be described in terms of UEs, e.g., a first UE, a second UE and a third UE; however, other wireless communications devices, in some exemplary embodiments, may be used in place of one or more of the UEs. Operation starts in step 202, in which the first UE is powered on and initialized. Operation proceeds from start step 202 to step 204 or step 206, e.g., depending upon the mode of operation (with regard to resource allocation).

In step 204 the first UE, e.g., operating in new radio (NR) sidelink (SL) mode 1 with regard to resource allocation, is operated to receive resources, e.g., resources defining a sidelink channel in unlicensed spectrum, allocated by a base station, e.g., a gNB, to the first UE. In various embodiments, the allocation is a conditional allocation based on the first UE determining that the resources are available (free), with regard to higher priority device usage. In some embodiments, in step 204 the first UE receives a resource grant (e.g., a conditional resource grant based on channel availability) from a base station, said resource grant granting sidelink channel resources which can be shared with another device. In one exemplary embodiment, in which step 204 is performed, the base station is gNB 1 102, the first UE is UE 4 116, a second UE is UE 5 118 and a third UE is UE 6 120.

In step 206 the first UE, e.g., operating in new radio (NR) sidelink (SL) mode 2 with regard to resource allocation, is operated to select resources (e.g., self-allocate resources), for a sidelink channel, from a pre-configured resource pool. In various embodiments, the self-allocation is a conditional self-allocation based on the first UE determining that the resources are available (free), with regard to higher priority device usage. In some embodiments, in step 206 the first UE selects sidelink channel resources for the first UE from a pre-configured resources pool, and said selected sidelink channel resources can be shared with another device. In one exemplary embodiment, in which step 206 is performed, the first UE is UE 1 110, a second UE is UE 2 112 and a third UE is UE 3 114.

Operation proceeds from step 204 or step 206 to step 208. In step 208 the first UE performs a listen-before talk operation on spectrum of the sidelink channel. Operation proceeds from step 208 to step 210. In step 210 the first UE is operated to initiate a channel occupancy time, for the sidelink channel, after successful completion of the LBT. In some embodiments, the duration of the channel occupancy time is a function of the channel access priority class corresponding to the first UE. Operation proceeds from step 210 to step 212. In step 212 the first UE determines to share some of channel occupancy time with a second UE. For example, the first UE may not have enough traffic data to communicate via PSSCH to the second UE during the COT to fill the entire COT, and thus the first UE decides to share some of its COT with the second UE, so that the remaining COT does not go to waste as unused time. As another example, the first UE may desire to receive some traffic data from the second UE during its COT, e.g., may desire to receive a rapid response to a query, and thus the first UE decides to share some of its COT with the second UE. Operation proceeds from step 212 to step 214.

In step 214, the first UE determines channel occupancy time (COT) sharing information including at least one of: i) a channel access priority class or ii) a COT duration value. Step 214 includes step 214 and/or step 218. In step 214 the first UE determines a channel access priority class value corresponding to the first UE (with respect to sidelink channel use). In one exemplary embodiment, the channel access priority class value is a 2 bit value. In some embodiments, each pattern of the 2 bit value represents a different time duration, e.g., 00=2 ms, 01=4 ms, 10=6 msec, and 11=9 msec. In some embodiments, the time duration indicated by the channel access priority class indicates the full channel occupancy time (COT) for the first UE to use the sidelink channel, from which the first UE may, and sometimes does, share a portion with the second UE. In step 218 the first UE determines a COT duration field value, e.g., a 5 bit value, indicating a number of sidelink slots being shared (indirectly indicating how much of the remaining COT duration the second UE can use for its own transmissions in the reverse direction). Operation proceeds from step 214, via connecting node A 219 to step 220.

In step 220 the first UE generates a set of sidelink control information (SCI) including COT sharing information to be communicated to the second UE. Step 220 includes steps 222, 224 and 226. In step 222 the first UE includes the determined channel access priority class value in COT sharing information to be communicated to the second UE. In step 224 the first UE includes a COT sharing indicator field value, e.g., a 1-bit field value with value=1 indicating that the first UE is sharing a portion of its COT with the second UE, in the COT sharing information to be communicated to the second UE. In step 226 the UE includes the determined COT duration field value, e.g., indicating a number of sidelink slots being shared, within the COT, that the second UE can use for its own transmissions to the first UE in the reverse direction (second UE→first UE direction). Operation proceeds from step 220 to step 228.

In step 228 the first UE transmits sidelink signals including PSCCH signals and PSSCH signals during a portion, e.g., a first portion of its COT, to the second UE. Step 228 includes step 230 and step 232. In step 230 the first UE transmits one or more PSCCH signals communicating, in sidelink control information (SCI), at least some of the determined COT sharing information, to the second UE. In step 232 the first UE transmits one or more PSSCH signals communicating at least some traffic data to the second UE. Step 230 includes steps 234, 236 and 238. In step 234 the first UE transmits, via sidelink control information (SCI) within PSSCH, the determined channel access priority class value, to the second UE. In step 236 the first UE transmits, via sidelink control information (SCI) within PSSCH, the COT-sharing indicator value to the second UE. In step 238 the first UE transmits, via sidelink control information (SCI) within PSSCH, the determined COT duration field value, to the second UE. Operation proceeds from step 228 to step 240.

In step 240 the first UE receives PSCCH/PSSCH signals from the second UE during the portion (e.g., the second portion) of the sidelink (SL) COT, which was shared with the second UE. Operation proceeds from step 240, via connecting node B 241 to step 242.

In step 242 the first UE receives sidelink signals, including PSCCH signals and PSSCH signals, from a portion, e.g., a first portion, of a third UE's COT. Step 242 includes steps 244 and 246. In step 244 the first UE receives one or more PSCCH signals communicating, in sidelink control information (SCI) at least some COT sharing information from the third UE. Step 244 includes steps 248, 250 and 252. In step 248 the first UE receives, via sidelink control information within PSCCH signals, a channel occupancy class value from the third UE. In step 250 the first UE is operated to receive, via sidelink control information within PSCCH signals, a COT-sharing indicator value from the third UE. In step 254 the first UE is operated to receive, via sidelink control information within PSSCH signals, a COT duration field value from the third UE, when communicated from the third UE, e.g., when the COT-sharing indicator value indicates sharing. In step 246 the first UE receives one or more PSSCH signals communicating at least some traffic data from the third UE. Operation proceeds from step 242 to step 254.

In step 254 the first UE determines if the received COT-sharing indicator value is set to indicate sharing, e.g., is the received COT-sharing indicator value equal to "1". If the received COT-sharing indicator value is set to indicate sharing, e.g., is set to "1", then operation proceeds from step 254 to step 256, in which the first UE determines that the third UE is sharing a portion of its COT with the first UE. Operation proceeds from step 256 to step 260. Alternatively, if the received COT-sharing indicator value indicates no sharing, e.g., the received COT-sharing indicator value="0", then operation proceeds from step 254 to step 258, in which the first UE determines that the third UE is not sharing a portion of its COT with the first UE.

Returning to step 260, in step 260 the first UE determines, e.g., infers, how much of the third UE's COT duration, the first UE can use for its own transmission in the reverse direction to the third UE based on the received channel access priority class value and the received COT duration value (e.g., determine the remaining portion of the third UE's COT which is being shared with the first UE). Step 260 includes step 262 and 264. In step 262 the first UE determines a maximum allowed COT (for the third UE) based on the received channel access priority class value and a mapping of different priority class values to different time intervals (e.g., 00=2 ms, 01=4 ms, 10=6 ms, and 11=8 ms). In step 264 the first UE uses the received COT duration field value, indicating a number of sidelink slots, to determine how much of the third UE's COT duration the first UE can use for its own transmission in the reverse direction. In some embodiments, the duration of a sidelink slot is a function of the implemented sidelink timing/frequency structure, e.g., information indicating the time duration of a symbol and information indicating the number of symbols in a slot. Operation proceeds from step 260 to step 266. In step 266 the first UE utilizes the shared portion (e.g. remaining portion) of the third UE; s COT indicated in received SCI for its own transmission to the third UE without any LBT or after a short pre-defined channel sensing duration, e.g., 25 micro-seconds. Step 266 includes step 268 in which the first UE transmits sidelink signals to the third UE (including PSCCH signals conveying control data and PSSCH signals conveying traffic data to third UE) during a portion (e.g., a second portion which is the shared portion) of the third UE's COT.

In one exemplary embodiment, the first UE determines the third UE's maximum allowed COT from the received channel access priority class value and a mapping of different priority class values to different time intervals (step 262). The first UE also determines the number of sidelink slots the first UE can use for its own transmissions in the reverse direction based on the received COT duration field value (part of step 264). The first UE converts the determined number of sidelink slots to a time interval (that it allowed to use) using stored information indicating the implemented SL timing structure, e.g., number of symbols in a SL slot and the duration of a symbol, e.g., determining a duration of a second portion of the third UE's COT (part of step 264). The first UE subtracts the determined time interval that it is allowed to use from the determined third UE's maximum COT, to identify the first portion of the COT (which is being used by the third UE to transmit to the first UE), and further identifies when the first UE should start to transmit to the third UE. In some embodiments, the first UE makes an adjustment to allow for a small pre-defined sensing interval, e.g., 25 micro-sec, prior to starting transmission to the third UE using the shared portion (second portion) of the third UE's COT, which it received.

Figure 3:
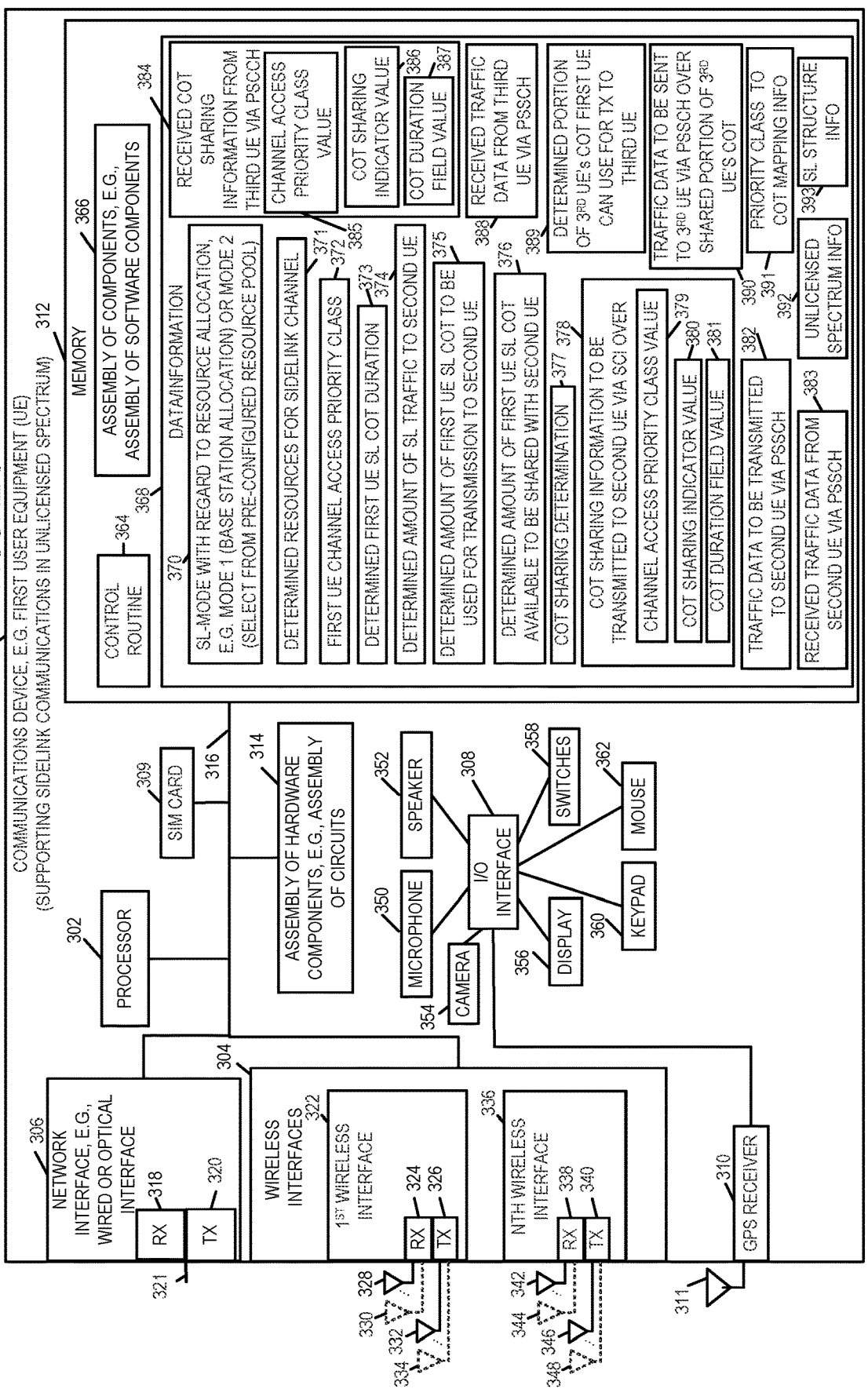
FIG. 3 is a drawing of an exemplary communications device, e.g., a user equipment (UE) supporting sidelink communications in unlicensed spectrum, in accordance with an exemplary embodiment.

FIG. 3 is a drawing of an exemplary communications device 300, e.g., a first user equipment (UE) supporting sidelink communications in unlicensed spectrum, in accordance with an exemplary embodiment. Exemplary communications device 300 is, e.g., any of the UE's (UE 1 110, UE 2 112, UE 3 114, UE 4 116, UE 5 118, UE 6 120, UE 7 122, . . . , UE N 124) of system 100 of FIG. 1 and/or a communications device, e.g., a UE, implementing the method of flowchart 200 of FIG. 2.

Exemplary communications device 300 includes a processor 302, e.g., a CPU, wireless interfaces 304, a network interface 306, an I/O interface 308, a SIM card 309, a GPS receiver 310, memory 312, and an assembly of hardware components 314, e.g., an assembly of circuits, coupled together via a bus 316 over which the various elements may interchange data and information. Communications device 300 further includes a plurality of I/O devices (microphone 350, speaker 352, camera 354, display 356, e.g., a touch-screen display, switches 358, keypad 360 and mouse 360) coupled to I/O interface 308, via which the various I/O devices may communicate with other elements of communications device 300.

Wireless interfaces 304 includes a plurality of wireless interfaces (1st wireless interface 322, . . . Nth wireless interface 336). 1st wireless interface 322 includes a wireless receiver 324 and a wireless transmitter 326. Wireless receiver 324 is coupled to one or more receive antennas or antenna elements (328, . . . 330) via which the communications device 300 may receive wireless signals, e.g., wireless signals including sidelink wireless signals in unlicensed spectrum, from other wireless communications devices. Wireless transmitter 326 is coupled to one or more transmit antennas or antenna elements (332, . . . 334) via which the communications device 300 may transmit wireless signals, e.g., wireless signals including sidelink wireless signals in unlicensed spectrum, to other wireless communications devices. In some embodiments, the same antennas or antenna elements may be, and sometimes are, used for receive and transmit.

Nth wireless interface 336 includes a wireless receiver 338 and a wireless transmitter 340. Wireless receiver 338 is coupled to one or more receive antennas or antenna elements (342, . . . 344) via which the communications device 300 may receive wireless signals, e.g., wireless signals including sidelink wireless signals in unlicensed spectrum, from other wireless communications devices. Wireless transmitter 340 is coupled to one or more transmit antennas or antenna elements (346, ... 348) via which the communications device 300 may transmit wireless signals, e.g., wireless signals including sidelink wireless signals in unlicensed spectrum, to other wireless communications devices. In some embodiments, the same antennas or antenna elements may be, and sometimes are, used for receive and transmit. In some embodiments, 1st wireless interface 322 supports different frequencies than is supported by Nth wireless interface 336, e.g., the 1st wireless interface 322 supports communications in spectrum including 5G Hz unlicensed spectrum and the Nth wireless interface 336 supports communications in spectrum including 6 GHz unlicensed spectrum.

Network interface 306, e.g., a wired or optical interface, includes a receiver 318 and a transmitter 320. The receiver 318 and transmitter 320 are coupled to a wireline or optical connector 321, via which the communications device 300 may be coupled to a wireline connection or optical connection when available.

GPS receiver 310 is coupled to GPS antenna 311, via which the communications device 300 receives GPS signals from GPS satellites. The received GPS signals are processed by the GPS receiver 210 to determine time, position, e.g., latitude/longitude, altitude, velocity information, and acceleration information.

Memory 312 includes a control routine 364, an assembly of components 366, e.g., an assembly of software components, and data/information 368. Control routine 364, when implemented by processor 302, controls communications device 300 to implement basic functions such as, e.g., memory access, memory storage, I/O device control, interface control, etc. Assembly of software components 372 includes, e.g., software routines, software subroutines, software modules, applications, etc., which when executed by processor 302 control the communications device 300 to implement steps of an exemplary method, e.g., steps of the exemplary method of flowchart 200 of FIG. 2.

Data/information 368 includes sidelink (SL)-mode with regard to resources allocation 370, e.g., mode 1 (base station allocation) or mode 2 (select from pre-configured resource pool), determined resources for sidelink channel 371, first UE channel access priority class 372, determined first UE SL maximum allowed channel occupancy time (COT) duration based on channel access priority class 373, determined amount of SL traffic to be sent to second UE 374, a determined amount first UE SL COT to be used by the first UE for transmission to the second UE 375, a determined amount of first UE SL COT available to be shared with the second UE 376, a COT sharing determination 377, and COT sharing information 378 to be transmitted to second UE via SCI over PSCCH signals. COT sharing information 378 includes a channel access priority class value 379, a COT sharing indicator value 380, and a COT duration field value 381. Data/information 368 further includes traffic data 382 to be transmitted to the second UE via PSSCH signals over a first portion of the first UEs COT, and received traffic data 383 from the second UE via PSSCH signals communicated over a second portion of the first UE's COT, which was shared by the first UE with the second UE.

Data/information 368 further includes received SL COT sharing information from a third UE via PSCCH signals including a channel access priority class value 385, a COT sharing indicator value 386 and a COT duration field value 387. Data/information 368 further includes received traffic data 388 from the third UE communicated via PSSCH signals during a first portion of the third UE's SL COT, a determined portion 389, e.g., a second portion, of the third UE's SL COT which the first UE can use for transmission to the third UE, traffic data 390 to be sent to the third UE via PSSCH signals over the shared portion (second portion) of the third UE's COT, priority calls to COT mapping information 391, unlicensed spectrum information (for SL) 392, e.g., information identifying a frequency band, e.g. within 5 GHz unlicensed spectrum or within 6 GHz unlicensed spectrum, to be used for sidelink (SL) communications, and sidelink (SL) structure information 393, e.g., information identifying various sidelink channels (physical sidelink control channel (PSCCH), physical sideline shared channel (PSSCH), demodulation reference signals (DMRS), physical sidelink feedback channel (PSFCH)), information specifying symbol duration, and information specifying the number of symbols in a slot.

Figure 4A:
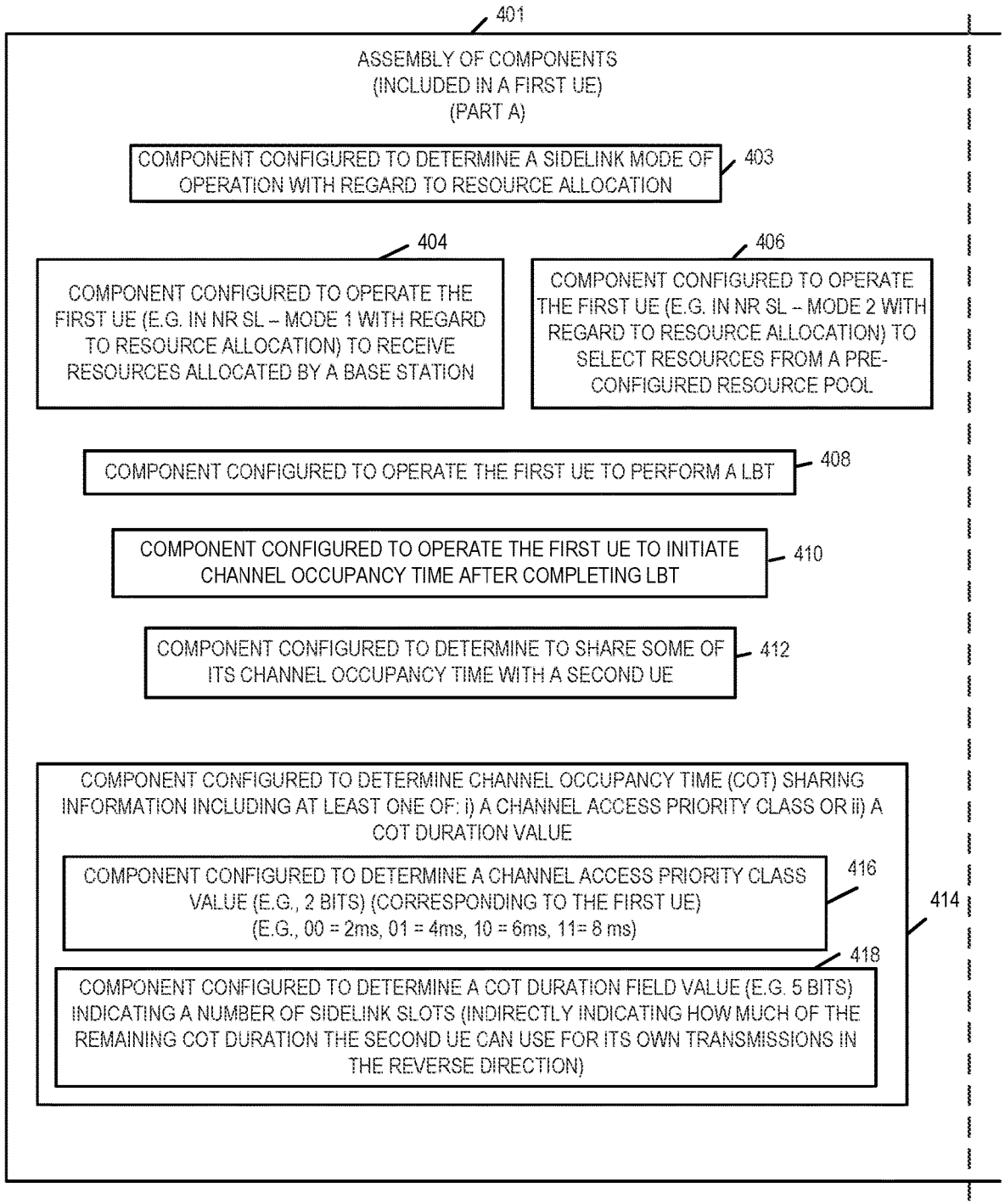
FIG. 4A is a first part of an exemplary assembly of components, which may be included in a communications device in accordance with an exemplary embodiment.
Figure 4B:
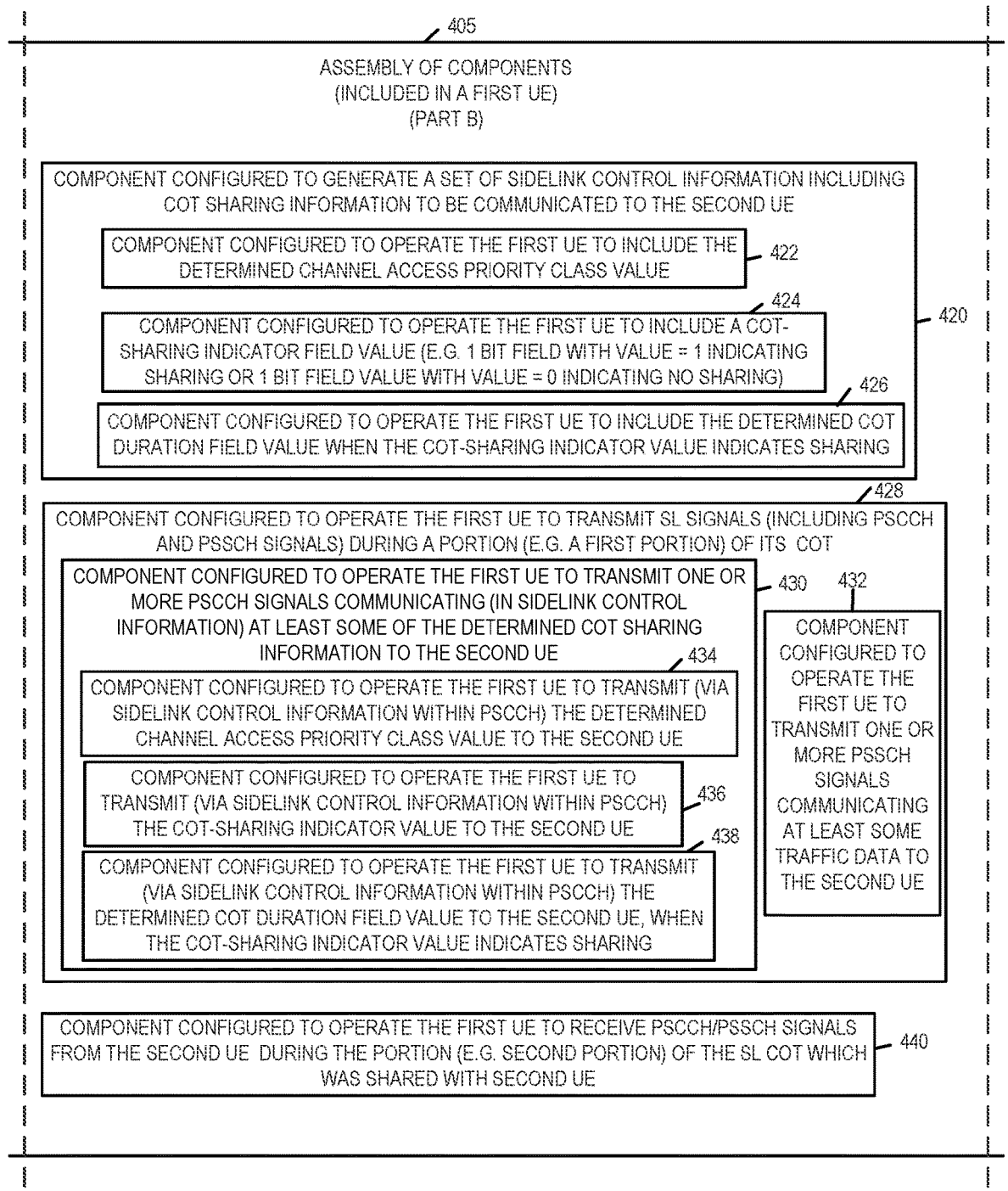
FIG. 4B is a second part of an exemplary assembly of components, which may be included in a communications device in accordance with an exemplary embodiment.

FIG. 4, comprising the combination of FIG. 4A, FIG. 4B, and FIG. 4C is a drawing of an exemplary assembly of components 400, comprising the combination of Part A 401, Part B 405 and Part C 407, which may be included in an exemplary communications device, e.g., communications device 300, e.g., a first UE, of FIG. 3, in accordance with an exemplary embodiment.

The components in the assembly of components 400 can be, and in some embodiments are, implemented fully in hardware within a processor, e.g., processor 302, e.g., as individual circuits. The components in the assembly of components 400 can be, and in some embodiments are, implemented fully in hardware within the assembly of hardware components 314, e.g., as individual circuits corresponding to the different components. In other embodiments some of the components are implemented, e.g., as circuits, within processor 302 with other components being implemented, e.g., as circuits within assembly of components 314, external to and coupled to the processor 302. As should be appreciated, the level of integration of components on the processor and/or with some components being external to the processor may be one of design choice. Alternatively, rather than being implemented as circuits, all or some of the components may be implemented in software and stored in the memory 312 of the communications device 300, with the components controlling operation of communications device 300 to implement the functions corresponding to the components when the components are executed by a processor e.g., processor 302. In some such embodiments, the assembly of components 400 is included in the memory 312, as part of an assembly of software components 366. In still other embodiments, various components in assembly of components 400 are implemented as a combination of hardware and software, e.g., with another circuit external to the processor providing input to the processor which then under software control operates to perform a portion of a component's function.

When implemented in software the components include code, which when executed by a processor, e.g., processor 302, configure the processor to implement the function corresponding to the component. In embodiments where the assembly of components 400 is stored in the memory 312, the memory 312 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the communications device 300, e.g., a first UE, or elements therein such as the processor 302, to perform the functions of corresponding steps illustrated in the signaling diagrams and/or described with respect to any of the Figures. Thus, the assembly of components 400 includes various components that perform functions of corresponding one or more described and/or illustrated steps of an exemplary method, e.g., steps of the method of flowchart 200 of FIG. 2.

Assembly of components 400 includes a component 403 configured to determine a sidelink mode of operation with regard to resource allocation, a component 404 configured to operate the first UE (e.g., in NR SL-mode 1 with regard to resource allocation) to receive resources (SL channel resources) allocated by a base station, e.g. a gNB, a component 406 configured to operate the first UE (e.g., in NR SL-mode 2 with regard to resource allocation) to select resources (SL channel resources) from a pre-configured resource pool, a component 408 configured to operate the first UE to perform a LBT, a component 410 configured to operate the first UE to initiate channel occupancy time (COT) after completing a LBT, a component 412 configured to determine to share some of its channel occupancy time with a second UE, and a component 414 configured to determine channel occupancy time (COT) sharing information including at least one of: i) a channel access priority class or ii) a COT duration value. Component 414 includes a component 416 configured to determine a channel access priority class value (e.g., a 2 bit value) (corresponding to the first UE), e.g. one of: 00, 01, 10 or 11, where 00 maps to 2 ms, where 01 maps to 4 ms, where 10 maps to 6 ms and where 11 maps to 8 ms. Component 414 further includes a component 418 configured to determine a COT duration field value (e.g., a 5 bit value) indicating a number of sidelink slots, e.g. indicately indicating how much of remaining COT duration the second UE can use for its own transmissions (to the first UE in the reverse direction (UE2→UE1).

Assembly of components 400 further includes a component 420 configured to generate a set of sidelink control information (SCI) including COT sharing information to be communicated to the second UE. Component 420 includes a component 422 configured to operate the first UE to include in the COT sharing information the determined channel access priority class value, a component 424 configured to operate the first UE to include a COT-sharing indicator field value (e.g., a 1 bit field value=1 indicating sharing or a 1 bit field value=0 indicating no sharing), and a component 426 configured to operate the first UE to include the determined COT duration field value when the COT-sharing indicator value indicates sharing.

Assembly of components 400 further includes a component 428 configured to operate the first UE to transmit sidelink (SL) signals (including PSCCH signals and PSSCH signals) during a portion, e.g., a first portion, of its COT. Component 428 includes a component 430 configured to operate the first UE to transmit one or more PSCCH signals communicating in sidelink control information (SCI) at least some of the determine COT sharing information to the second UE, and a component 432 configured to operate the first UE to transmit one or more PSSCH signals communicating at least some traffic data to the second UE. Component 430 includes a component 434 configured to operate the first UE to transmit (via sidelink control information within PSCCH signals) the determined channel access priority class value to the second UE, a component 436 configured to operate the first UE to transmit (via sidelink control information within PSCCH signals) the COT-sharing indicator value to the second UE, and a component 438 configured to operate the first UE to transmit (via sidelink control information with PSCCH signals) the determined COT duration field value to the second UE, when the COT-sharing indicator value indicates sharing.

Assembly of components 400 further includes a component 440 configured to operate the first UE to receive PSCCH/PSSCH signals from the second UE during a portion, e.g., a second portion of the SL COT, which was shared with the second UE. In various embodiments, the start of transmission by the second UE in the second portion of the COT is immediate (without LBT) or after a small predefined channel sensing during, e.g. 25 micro-sec, following the end of transmission by the first UE during the first portion of the COT.

Assembly of components 400 further includes a component 442 configured to operate the first UE to receive sidelink (SL) signals (including PSCCH signals and PSSCH signals) from a third UE during a portion, e.g., a first portion, of the third UE's COT. Component 442 includes a component 444 configured to operate the first UE to receive one or more PSCCH signals communicating (in sidelink control information (SCI)) at least some COT sharing information from the third UE and a component 446 configured to operate the first UE to receive one or more PSSCH signal communicating at least some traffic data from the third UE. Component 444 includes a component 448 configured to operate the first UE to receive (via sidelink control information within PSCCH signals) a channel access priority class value from the third UE, a component 450 configured to operate the first UE to receive (via sidelink control information within PSCCH signals) a COT-sharing indicator value from the third UE, and a component 452 configured to operate the first UE to receive (via sidelink control information within PSCCH signals) a COT duration field value from the third UE, when a received COT duration field value is transmitted by the first UE.

Assembly of components 400 further includes a component 454 configured to determine if the received COT-sharing indicator value is set, e.g., equal to 1, to indicate sharing of COT or is indicating no sharing of COT, e.g., COT-sharing indicator value=0. Assembly of components 400 further includes a component 456 configured to determine that the third UE is sharing a portion of its COT (corresponding to SL channel) with the first UE, and a component 458 configured to determine that the third UE is not sharing a portion of its COT (corresponding to SL channel) with the first UE. Assembly of components 400 includes a component 460 configured to determine, e.g., infer, how much of the third UE's COT duration, the first UE can use for its own transmissions in the reverse direction to the third UE based on the received channel access priority class value and the received COT duration value (e.g., determine the remaining portion of the third UE's COT which is being shared with the first UE. Component 460 includes a component 462 configured to determine a maximum allowed COT (for the third UE) based on the received channel access priority class value and a mapping of different priority class value (e.g., 00, 01, 10, 11) to different time intervals (e.g., 2 ms, 4 ms, 6 ms, 8 ms), and a component 464 configured to operate the first UE to use the received COT duration field value, indicating a number of sidelink, slots to determine how much of the third UE's duration the first UE can uses for its own transmission in the reverse direction.

Assembly of components 400 further includes a component 466 configured to operate the first UE to utilize the shared portion (e.g., remaining portion) of third UE's COT indicated in received sidelink control information for its own transmission to the third UE without any LBT or after a short pre-defined channel sensing duration, e.g., 25 μs. Component 466 includes a component 468 configured to operate the first UE to transmit sidelink (SL) signals to the third UE (including PSCCH signals conveying control data and PSSCH signals conveying traffic data to the third UE) during a portion (e.g., a second portion which is the shared portion) of the third UE's COT.

Figure 5:
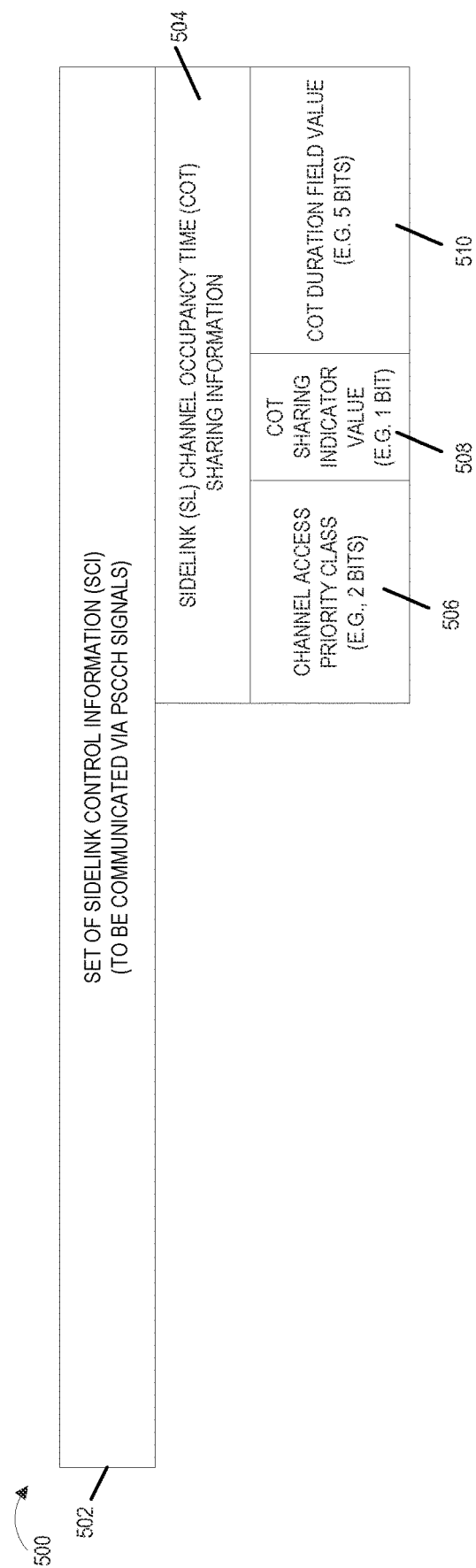
FIG. 5 is a drawing illustrating an exemplary set of sidelink control information (SCI) including exemplary sidelink (SL) channel occupancy time (COT) sharing information in accordance with an exemplary embodiment.

FIG. 5 is a drawing 500 illustrating an exemplary set of sidelink control information (SCI) 500 to be communicated via PSCCH signals in accordance with an exemplary embodiment. The exemplary set of SCI includes sidelink (SL) channel occupancy time (COT) sharing information 504 in accordance with an exemplary embodiment. The SL COT sharing information 504 includes a channel access priority class value (e.g., 2 bits) 506, a COT-sharing indicator value (e.g., 1 bit) 508, and a COT duration field value (e.g., 5 bits) 510.

Figure 6:
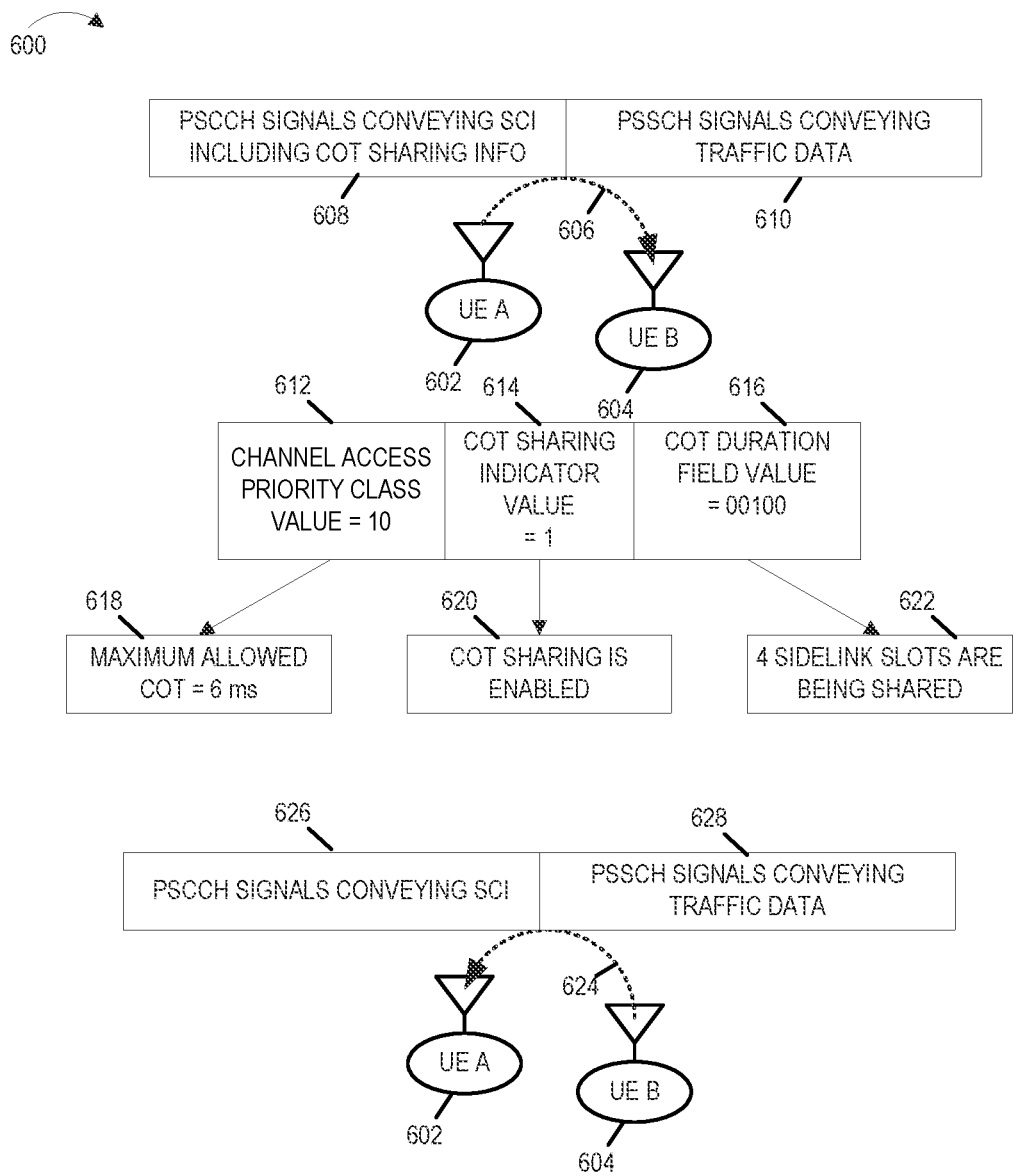
FIG. 6 is a drawing of an example in which a first UE sends SL COT sharing information to a second UE to share a portion of its SL COT with the second UE, in accordance with an exemplary embodiment.

FIG. 6 is a drawing 600 illustrating an example in which a first UE, which is UE A 602, sends SL COT sharing information to a second UE, which is UE B 604 to share a portion of its SL COT with the second UE 604, in accordance with an exemplary embodiment. UE A 602 and UE B 604 are, e.g., any of the UEs of system 100 of FIG. 1. UE A 602 transmits sidelink signals 606 to UE B 604 during a first portion of its COT. The sidelink signals 606 include PSCCH signals 608 conveying SCI including COT sharing information and PSSCH signals 610 conveying traffic data.

The COT sharing information includes a channel access priority class value 612, which equals 10, a COT sharing indicator value 614, which equals 1, and a COT duration field value which equals 00100. The channel access priority class value=10 indicates that the maximum allowed COT=6 ms, as indicated by box 618. The COT sharing indicator value=1 indicates that COT sharing is enabled, as indicated by box 620. The COT duration field value=00100 indicates that 4 sidelink slots are being shared, as indicated by box 622. Each sidelink slot has a duration which is known by UE A 602 and UE B 610, e.g., based on the SL timing frequency structure being implemented. UE B 604, which has received the SL COT sharing information recovers decodes the received signals recovering the communicated information including 6 ms. COT enables, and 4 sidelink slots being shared. From this information, UE B 604 determines which portion of the maximum allowed COT is being shared with UE B 604, which portion is being used by UE A 602 for transmission, and when UE B 604 is to start transmission to UE A 602. UE B 604 transmits sidelink signals 624 to UE A 602 (during the second portion of UE A's COT) over the same sidelink channel which UE A 602 has used to transmit signals 606 to UE B 604 during the first portion of UE A's COT.

Figure 7:
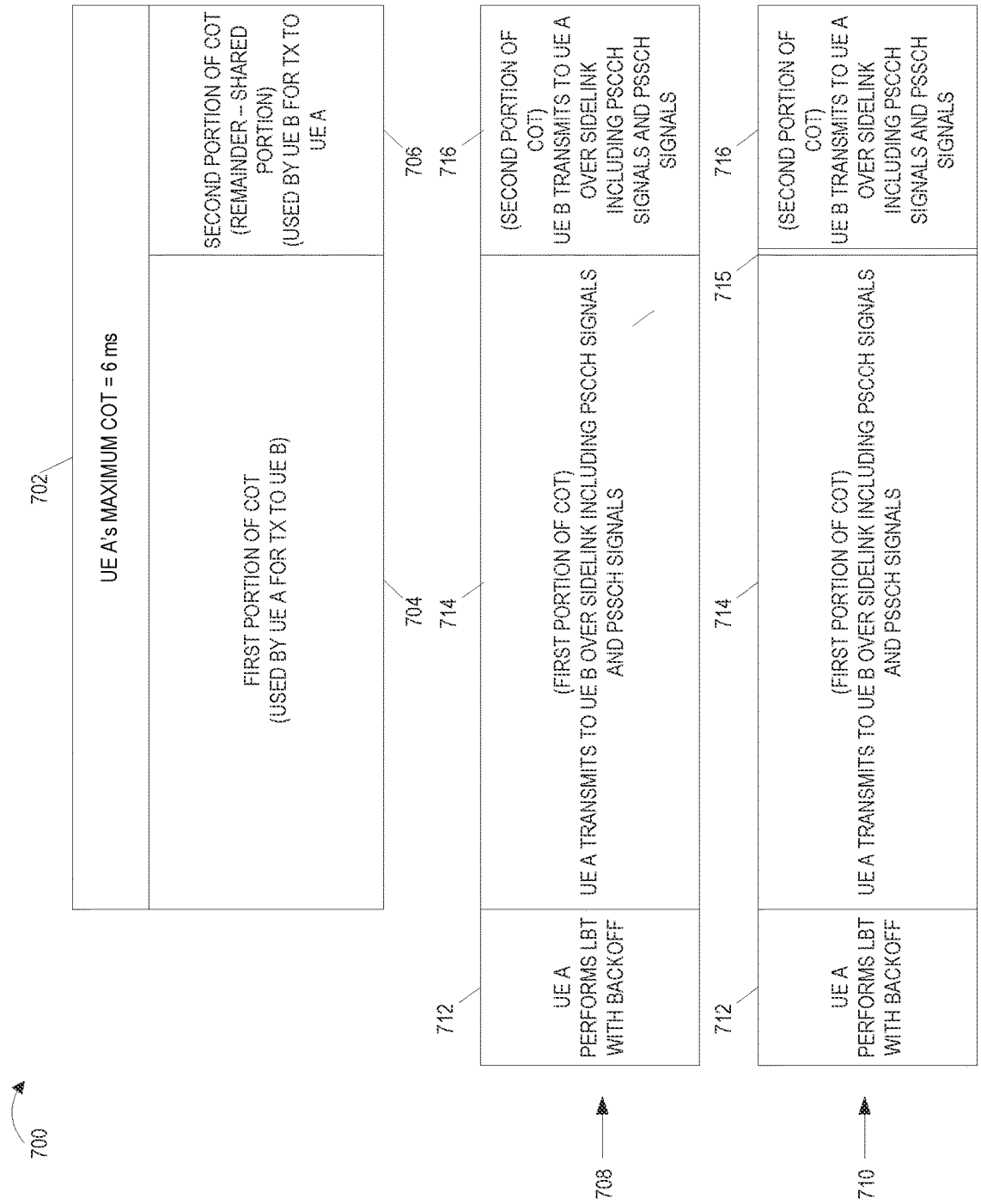
FIG. 7 is a drawing illustrating an exemplary maximum COT, exemplary COT portions used by the first and second UEs for transmission, and exemplary operations performed by the first and second UEs corresponding to the example of FIG. 6.

FIG. 7 is a drawing 700 illustrating an exemplary maximum COT, exemplary COT portions used by the first and second UEs for transmission, and exemplary operations performed by the first and second UEs corresponding to the example of FIG. 6. UE A's exemplary maximum COT=6 ms, as indicated by box 702. UE A's maximum COT 702 includes a first portion 704 to be used by UE A 602 for transmission to UE B 604 and a second portion 706 (sometimes referred to as a remainder portion or shared portion) to be used by UE B 604 for transmission to UE A 602.

In one exemplary embodiment, indicated by row 708, UE B 604 starts its transmission directly following the completion of transmission by UE A 604. In another embodiment, indicated by row 701, UE B 604 starts its transmission, after a small pre-defined sensing interval, e.g., 25 micro-sec, following the completion of transmission by UE A 604. In each case (708, 710), UE A 602 initially performs a LBT operation with backoff 712, which is followed by UE A 604 transmission 714 to UE B over sidelink including PSCCH signals and PSSCH signals during the first portion of the COT. In the case of example 708, the transmission in first portion 714 is immediately followed by UE B 604 transmission 716 to UE A 602 over sidelink including PSCCH signals and PSSCH signals during the second portion of COT. In the case of example 710, the transmission 714 in first portion is followed by a short UE sensing pre-defined interval 715, and then by UE B 604 transmission 716' to UE A 602 over sidelink including PSCCH signals and PSSCH signals during the second portion of COT.

Various aspects and/or features of some embodiments of the present invention are further discussed below. Various methods and apparatus, in accordance with the present invention are directed to how a wireless communications device, e.g., a user equipment (UE), can share its sidelink (SL) channel occupancy time (COT) with another SL wireless communications device, e.g., another UE. In some embodiments, a first UE (e.g., UE A), initiates a COT with a random backoff listen-before-talk (LBT) followed by physical Sidelink Shared Channel/Physical Sidelink Control Channel (PSSCH/PSCCH) transmissions, and a receiving UE, e.g., a second UE (e.g., UE B), then initiates a second set of PSSCH/PSCCH transmissions in the reverse direction without any LBT or with a short, predefined channel sensing duration, e.g., 25 μs. The PSCCH transmitted by the first UE (UE A) conveys novel COT sharing information, which is used by the second UE (UE B) to determine what portion of the first UE's COT is being shared with the second UE. In some embodiments, in accordance with a feature of some embodiments of the present invention, the 1st-stage sidelink control information (SCI) on Physical Sidelink Control Channel (PSCCH) includes novel COT sharing information including: a channel access priority class (e.g., 2 bits), a COT-sharing indicator field (e.g., 1 bit), and a COT duration field in number of sidelinks slots (e.g., 5 bits). The inclusion of this novel COT sharing information in SCI is an expansion over the existing set of SCI information (See TS 38.212 V16.6.0 (2021-06) NR: Multiplexing and channel coding (Release 16)). The inclusion of this novel COT sharing information in SCI facilitates sidelink COT sharing in an efficient manner, e.g., with low overhead. The sharing of a portion of a first UE's SL COT allows for UEs to efficiently (e.g., more fully) utilize the available sidelink resources, e.g., minimizing waste, by allowing sharing of unused SL resources corresponding to a portion of the first UE's COT, which might otherwise go unused (e.g., because the first UE does not enough traffic data to fill the entire COT) and be wasted. In addition, the second UE, which receives the shared COT SL resources is allowed to quickly respond to the first UE without having to perform a random backoff LBT, thus reducing overhead, and providing for a rapid exchange of information including traffic data between the two UEs.

In some embodiments, the channel access priority class implicitly indicates the maximum allowed COT that can be used (e.g., 2 ms, 4 ms, 6 ms, or 8 ms). If a receiving UE (e.g., UE B), sees that the COT sharing-indicator is set to "1", it can use the COT duration field (number of SL slots) to infer how much of the remaining COT duration it can use for its own transmissions in the reverse direction.

In one exemplary embodiment, a first UE initiates channel occupancy time after completing LBT. The first UE sends COT sharing indicator and COT time duration on SCI to a second UE. The second UE utilizes remaining portion of the COT indicated in SCI for its own transmissions to the first UE after a short sensing.

Numbered List of Exemplary Method Embodiments

Method Embodiment 1. A method of operating a first communications device (e.g., a first UE), the method comprising: determining (214) channel occupancy time (COT) sharing information including at least one of i) a channel access priority class value or ii) a COT duration value; and transmitting (230) one or more physical sidelink control channel (PSCCH) signals to a second communications device (e.g., a second UE) communicating at least some of the determined COT sharing information.

Method Embodiment 1a. The method of Method Embodiment 1, wherein said first communications device is a first user equipment (UE) supporting sidelink communications in unlicensed spectrum.

Method Embodiment 1aa. The method of Method Embodiment 1a, wherein said unlicensed spectrum is a band of 5 GHz spectrum or a band of 6 GHz spectrum Method Embodiment 1A. The method of Method Embodiment 1, wherein said first communications device is operating in a new radio-sidelink (NR-SL) mode 1 with regard to resource allocation (e.g., base station, e.g., gNB allocates resources), the method further comprising: receiving (204) a resource grant (a conditional resource grant based on channel availability) from a base station (e.g., a gNB) granting sidelink channel resources which can be shared with another device, said COT sharing information corresponding to resources granted to the first communications device in said resource grant.

Method Embodiment 1B. The method of Method Embodiment 1, wherein said first communications device is operating in a NR-SL mode 2 with regard to resource allocation (e.g., first UE is outside coverage area of base stations, and first UE selects resources from a pre-configured resource pool), the method further comprising: selecting (206) sidelink channel resources for the first communications device from a pre-configured resources pool which can be shared with another device, said COT sharing information corresponding to resources selected by the first communications device for the first communications device.

Method Embodiment 2. The method of Method Embodiment 1, wherein said COT sharing information corresponds to a sidelink channel (e.g., a sidelink channel including PSCCH and PSSCH resources) in unlicensed spectrum.

Method Embodiment 3. The method of Method Embodiment 1, wherein determining (214) channel occupancy time (COT) sharing information includes determining (216) said channel access priority class value; and wherein said channel priority access class value is a multi-bit value (e.g., 2 bit value) indicating a channel priority access class of the first communications device (e.g., with respect to sidelink channel use).

Method Embodiment 3a. The method of Method Embodiment 3, wherein said priority class value corresponds (maps) to a time duration (for COT) (e.g., bit pattern 00=2 ms, bit pattern 01=4 ms, bit pattern 10=6 ms, and bit pattern 11=8 ms).

Method Embodiment 4. The method of Method Embodiment 3, wherein transmitting (230) PSCCH signals communicating COT sharing information includes transmitting (234) the multi-bit value as the channel access priority class value.

Method Embodiment 4a. The method of Method Embodiment 4, wherein the multi-bit channel access priority class value is a two bit value.

Method Embodiment 5. The method of Method Embodiment 4, wherein transmitting (230) PSCCH signals communicating COT sharing information further includes transmitting (238) a COT duration value indicating a number of sidelink slots being shared.

Method Embodiment 5A. The method of Method Embodiment 5, wherein the COT duration value includes more bits than the multi-bit channel access priority class value.

Method Embodiment 5B. The method of Method Embodiment 5A, wherein the COT duration value includes 5 bits.

Method Embodiment 6. The method of Method Embodiment 4, wherein transmitting (230) PSCCH signals communicating COT sharing information further includes transmitting (236) a COT sharing indicator value.

Method Embodiment 6A. The method of Method Embodiment 6, wherein the transmitted COT sharing indicator value is set to a first value (e.g., 1) when COT sharing is enabled by the first communications device and set to a second value (e.g., 0) when COT sharing is not enabled (e.g., disabled) by the first device.

Method Embodiment 7. The method of Method Embodiment 6, further comprising:
transmitting (232) physical sidelink shared channel (PSSCH) signals communicating traffic data to the second communications device during a first portion of the COT (the portion of the COT which is used by the first communications device).

Method Embodiment 7A. The method of Method Embodiment 7, wherein said one or more physical sidelink control channel (PSCCH) signals communicating at least some of the determined COT sharing information and said PSSCH signals communicating traffic data are both transmitted during the first portion of the COT.

Method Embodiment 8. The method of Method Embodiment 7, further comprising: receiving (240) PSCCH signals and PSSCH signals from the second communications device, which are directed to the first communications device, during a second portion of the COT (second portion being the portion of the COT which was shared by the first communications device with the second communications device).

Method Embodiment 9. The method of Method Embodiment 1, further comprising: receiving (244) PSCCH signals from a third communications device (e.g., a third UE) communicating COT sharing information provided by the third communications device; and determining (260) how much of a third communications device's COT duration, the first communications device can use for transmission (over the sidelink resources corresponding to the third communications device's COT) to the third communications device.

Method Embodiment 9A. The method of Method Embodiment 9, wherein said third communications device is a communications device which transmits sidelink signals (PSCCH signals (control information) and PSSCH signals (traffic data)) to the first communications device over sidelink resources during a first portion of the third communications device's COT and receives sidelink signals (PSCCH signals (control information) and PSSCH signals (traffic data)) over sidelink resources during a second portion of the third communications device's COT.

Method Embodiment 10. The method of Method Embodiment 9, further comprising: operating (268) the first communications device to use at least some of the third communications device's COT duration (e.g., at least some of the third communications device's remaining COT (which was shared with the first communications device)) to transmit sidelink signals (PSCCH signals conveying control information/PSSCH signals conveying traffic data) to the third communications device.

Method Embodiment 11. The method of Method Embodiment 10, further comprising, prior to using (268) at least some of the third communication device's COT duration to transmit sidelink signals to the third communications device: determining (256), (e.g., by examining (254) a COT sharing indicator value received from the third communications device) at the first UE, from a COT sharing indicator value included in the COT sharing information received from the third UE, that COT sharing of a sidelink channel being used by the third communications device to transmit to the first communications device is enabled, e.g. the first communications device is being allocated a portion of the third communications device's COT to use for transmission to the third communications device.

Method Embodiment 12. The method of Method Embodiment 11, further comprising: determining (262) a maximum allowed COT (for the third communications device) based on priority class information indicated by the third communications device in COT sharing information received by the first communications device and a mapping of different priority class values (e.g., 00, 01, 10, 11) to different time intervals (e.g., 2 ms, 4 ms, 6 ms, 8 ms); and wherein said determining (260) how much of the third communication device's COT duration the first UE can use for transmission is based on a determination of how much of the maximum allowed COT remains unused by the third communications device.

Numbered List of Exemplary Apparatus Embodiments

Apparatus Embodiment 1. A first communications device (e.g., a first UE) (UE 1 110 or UE 4 116 or UE 300), comprising: a wireless transmitter (326); and a processor (302) configured to: determine (214) channel occupancy time (COT) sharing information including at least one of i) a channel access priority class value or ii) a COT duration value; and operate the first communications device to transmit (230) (e.g., via wireless transmitter 326) one or more physical sidelink control channel (PSCCH) signals to a second communications device (e.g., a second UE) (UE 2 112 or UE 5 118) communicating at least some of the determined COT sharing information.

Apparatus Embodiment 1a. The first communications device of Apparatus Embodiment 1, wherein said first communications device is a first user equipment (UE) supporting sidelink communications in unlicensed spectrum.

Apparatus Embodiment 1aa. The first communications device of Apparatus Embodiment 1a, wherein said unlicensed spectrum is a band of 5 GHz spectrum or a band of 6 GHz spectrum.

Apparatus Embodiment 1A. The first communications device of Apparatus Embodiment 1, wherein said first communications device is operating in a new radio-sidelink (NR-SL) mode 1 with regard to resource allocation (e.g., base station, e.g., gNB allocates resources), the first communications device further comprising: a wireless receiver (324); and wherein said processor (302) is further configured to: operate the first communications device to receive (204) (e.g., via wireless receiver 324) a resource grant (a conditional resource grant based on channel availability) from a base station (e.g., a gNB) granting sidelink channel resources which can be shared with another device, said COT sharing information corresponding to resources granted to the first communications device in said resource grant.

Apparatus Embodiment 1B. The first communications device of Apparatus Embodiment 1, wherein said first communications device is operating in a NR-SL mode 2 with regard to resource allocation (e.g., first UE is outside coverage area of base stations, and first UE selects resources from a pre-configured resource pool), and wherein said processor (302) is further configured to: select (206) sidelink channel resources for the first communications device from a pre-configured resources pool which can be shared with another device, said COT sharing information corresponding to resources selected by the first communications device for the first communications device.

Apparatus Embodiment 2. The first communications device of Apparatus Embodiment 1, wherein said COT sharing information corresponds to a sidelink channel (e.g., a sidelink channel including PSCCH and PSSCH resources) in unlicensed spectrum.

Apparatus Embodiment 3. The first communications device of Apparatus Embodiment 1, wherein said processor (302) is configured to: determine (216) said channel access priority class value, as part of being configured to determine (214) channel occupancy time (COT) sharing information; and wherein said channel priority access class value is a multi-bit value (e.g., 2 bit value) indicating a channel priority access class of the first communications device (e.g., with respect to sidelink channel use).

Apparatus Embodiment 3a. The first communications device of Apparatus Embodiment 3, wherein said priority class value corresponds (maps) to a time duration (for COT) (e.g., bit pattern 00=2 ms, bit pattern 01=4 ms, bit pattern 10=6 ms, and bit pattern 11=8 ms).

Apparatus Embodiment 4. The first communications device of Apparatus Embodiment 3, wherein transmitting (230) PSCCH signals communicating COT sharing information includes transmitting (234) the multi-bit value as the channel access priority class value.

Apparatus Embodiment 4a. The first communications device of Apparatus Embodiment 4, wherein the multi-bit channel access priority class value is a two bit value.

Apparatus Embodiment 5. The first communications device of Apparatus Embodiment 4, wherein said processor (302) is configured to: operate the first communications device to transmit (238) (e.g., via wireless transmitter 326) a COT duration value indicating a number of sidelink slots being shared, as part of being configured to operate the first communications device to transmit (230) PSCCH signals communicating COT sharing information.

Apparatus Embodiment 5A. The first communications device of Apparatus Embodiment 5, wherein the COT duration value includes more bits than the multi-bit channel access priority class value.

Apparatus Embodiment 5B. The first communications device of Apparatus Embodiment 5A, wherein the COT duration value includes 5 bits.

Apparatus Embodiment 6. The first communications device of Apparatus Embodiment 4, wherein said processor (302) is configured to operate the first communications device to transmit (236) a COT sharing indicator value (e.g., via wireless transmitter 326), as part of being configured to operate the first communications device to transmit PSCCH signals communicating COT sharing information.

Apparatus Embodiment 6A. The method of Apparatus Embodiment 6, wherein the transmitted COT sharing indicator value is set to a first value (e.g., 1) when COT sharing is enabled by the first communications device and set to a second value (e.g., 0) when COT sharing is not enabled (e.g., disabled) by the first device.

Apparatus Embodiment 7. The first communications device of Apparatus Embodiment 6, wherein said processor (302) is further configured to: operate the first communications device to transmit (232) (e.g., via wireless transmitter 326) physical sidelink shared channel (PSSCH) signals communicating traffic data to the second communications device during a first portion of the COT (the portion of the COT which is used by the first communications device).

Apparatus Embodiment 7A. The first communications device of Apparatus Embodiment 7, wherein said one or more physical sidelink control channel (PSCCH) signals communicating at least some of the determined COT sharing information and said PSSCH signals communicating traffic data are both transmitted during the first portion of the COT.

Apparatus Embodiment 8. The first communications device of Apparatus Embodiment 7, wherein said processor (302) is further configured to: operate the first communications device to receive (240) (e.g., via wireless receiver 324) PSCCH signals and PSSCH signals from the second communications device, which are directed to the first communications device, during a second portion of the COT (second portion being the portion of the COT which was shared by the first communications device with the second communications device).

Apparatus Embodiment 9. The first communications device of Apparatus Embodiment 1, wherein said processor (302) is further configured to: operate the first communications device to receive (244) (e.g., via wireless receiver 324) PSCCH signals from a third communications device (e.g., a third UE) (e.g., UE 3 114 or UE 6 120) communicating COT sharing information provided by the third communications device; and determine (260) how much of a third communications device's COT duration, the first communications device can use for transmission (over the sidelink resources corresponding to the third communications device's COT) to the third communications device.

Apparatus Embodiment 9A. The first communications device of Apparatus Embodiment 9, wherein said third communications device is a communications device which transmits sidelink signals (PSCCH signals (control information) and PSSCH signals (traffic data)) to the first communications device over sidelink resources during a first portion of the third communications device's COT and receives sidelink signals (PSCCH signals (control information) and PSSCH signals (traffic data)) over sidelink resources during a second portion of the third communications device's COT.

Apparatus Embodiment 10. The first communications device of Apparatus Embodiment 9, wherein said processor (302) is further configured to: operate (268) the first communications device to use at least some of the third communications device's COT duration (e.g., at least some of the third communications device's remaining COT (which was shared with the first communications device)) to transmit sidelink signals (PSCCH signals conveying control information/PSSCH signals conveying traffic data) to the third communications device.

Apparatus Embodiment 11. The first communications device of Apparatus Embodiment 10, wherein said processor (302) is further configured to, prior to operating the first communications device to use (268) at least some of the third communication device's COT duration to transmit sidelink signals to the third communications device, determine (256), (e.g., by examining (254) a COT sharing indicator value received from the third communications device) at the first UE, from a COT sharing indicator value included in the COT sharing information received from the third UE, that COT sharing of a sidelink channel being used by the third communications device to transmit to the first communications device is enabled, e.g. the first communications device is being allocated a portion of the third communications device's COT to use for transmission to the third communications device.

Apparatus Embodiment 12. The first communications device of Apparatus Embodiment 11, wherein said processor (302) is configured to: determine (262) a maximum allowed COT (for the third communications device) based on priority class information indicated by the third communications device in COT sharing information received by the first communications device and a mapping of different priority class values (e.g., 00, 01, 10, 11) to different time intervals (e.g., 2 ms, 4 ms, 6 ms, 8 ms); and wherein said determining (260) how much of the third communication device's COT duration the first UE can use for transmission is based on a determination of how much of the maximum allowed COT remains unused by the third communications device.

Non-Transitory Computer Readable Medium Embodiments

Non-Transitory Computer Readable Medium Embodiment 1. A non-transitory computer readable medium (312) including machine executable instructions, which when executed by a processor (302) of a first communications device (e.g., a first UE) (300), control the first communications device (300) to perform the steps of: determining (214) channel occupancy time (COT) sharing information including at least one of i) a channel access priority class value or ii) a COT duration value; and transmitting (230) one or more physical sidelink control channel (PSCCH) signals to a second communications device (e.g., a second UE) communicating at least some of the determined COT sharing information.

Various embodiments are directed to apparatus, e.g., access points (APs), e.g., WiFi APs, base stations such as NRU gNB base stations, etc., user devices such as stations (STAs), e.g., WiFi STAs, user equipment (UE) devices, e.g., UEs supporting sidelink communications in unlicensed spectrum, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices.

Various embodiments are also directed to methods, e.g., method of controlling and/or operating access points (APs), e.g., WiFi APs, base stations such as NRU gNB base stations, etc., user devices such as stations (STAs), e.g., WiFi STAs, user equipment (UE) devices, e.g., UEs supporting sidelink communications in unlicensed spectrum, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., an access points (AP), e.g., WiFi AP, base stations such as NRU gNB base station, etc., a user device such as a station (STA), e.g., WiFi STA, a user equipment (UE) device, e.g., UEs supporting sidelink communications in unlicensed spectrum, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., communications nodes such as e.g., access points (APs), e.g., WiFi APs, base stations such as NRU gNB base stations, etc., user devices such as stations (STAs), e.g., WiFi STAs, user equipment (UE) devices, e.g., UEs supporting sidelink communications in unlicensed spectrum, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., an access points (AP), e.g., WiFi AP, a base station such as NRU gNB base station, etc., a user device such as station (STA), e.g., WiFi STA, a user equipment (UE) device, e.g., a UE supporting sidelink communications in unlicensed spectrum, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., an access points (AP), e.g., WiFi AP, a base station such as NRU gNB base station, etc., a user device such as a station (STA), e.g., WiFi STA, a user equipment (UE) device, e.g., a UE supporting sidelink communications in unlicensed spectrum, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a communications nodes such as e.g., an access point (AP), e.g., WiFi AP, a base station such as NRU gNB base station, etc., a user device such as a station (STA), e.g., WiFi STA, a user equipment (UE) device, e.g., a UE supporting sidelink communications in unlicensed spectrum, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first communications device, the method comprising:
   determining channel occupancy time (COT) sharing information including at least: i) a multi-bit channel access priority class value and ii) a COT duration value, indicating a number of sidelink slots being shared; and
   transmitting one or more physical sidelink control channel (PSCCH) signals to a second communications device, said one or more PSCCH signals communicating at least some of the determined COT sharing information, said transmitted one or more PSCCH signals communicating the multi-bit channel access priority class value and the COT duration value.

2. The method of claim 1, wherein said determined COT sharing information corresponds to a sidelink channel in unlicensed spectrum.

3. The method of claim 1, wherein said multi-bit channel access priority class value indicates a channel priority access class of the first communications device.

4. The method of claim 3, wherein said multi-bit channel access priority class value is a two bit value.

5. The method of claim 4, wherein the COT duration value includes more bits than the multi-bit channel access priority class value.

6. A method of operating a first communications device, the method comprising:
   determining channel occupancy time (COT) sharing information including at least a multi-bit channel access priority class value indicating a channel priority class of the first communications device; and
   transmitting one or more physical sidelink control channel (PSCCH) signals to a second communications device, said one or more PSCCH signals communicating determined COT sharing information, said determined COT sharing information including said multi-bit channel access priority value and further including a COT sharing indicator value.

7. The method of claim 6, further comprising:
   transmitting physical sidelink shared channel (PSSCH) signals communicating traffic data to the second communications device during a first portion of the COT.

8. The method of claim 7, further comprising:
   receiving PSCCH signals and PSSCH signals from the second communications device, which are directed to the first communications device, during a second portion of the COT.

9. A method of operating a first communications device, the method comprising:
   determining channel occupancy time (COT) sharing information including at least one of i) a channel access priority class value or ii) a COT duration value; and
   transmitting one or more physical sidelink control channel (PSCCH) signals to a second communications device, said one or more PSCCH signals to the second communications device communicating at least some of the determined COT sharing information;
   receiving PSCCH signals from a third communications device, said received PSCCH signals from the third communications device communicating COT sharing information provided by the third communications device; and
   determining how much of a third communications device's COT duration, the first communications device can use for transmission to the third communications device.

10. The method of claim 9, further comprising:
    operating the first communications device to use at least some of the third communications device's COT duration to transmit sidelink signals to the third communications device.

11. The method of claim 10, further comprising, prior to using at least some of the third communication device's COT duration to transmit sidelink signals to the third communications device:
    determining, at the first communications device, from a COT sharing indicator value included in the COT sharing information received from the third communications device, that COT sharing of a sidelink channel being used by the third communications device to transmit to the first communications device is enabled.

12. The method of claim 11, further comprising:
    determining a maximum allowed COT based on priority class information indicated by the third communications device in COT sharing information received by the first communications device and a mapping of different priority class values to different time intervals; and wherein said determining how much of the third communication device's COT duration the first communications device can use for transmission is based on a determination of how much of the maximum allowed COT remains unused by the third communications device.

13. A first communications device, comprising:
a wireless transmitter; and
a processor configured to:
  determine channel occupancy time (COT) sharing information including at least: i) a multi-bit channel access priority class value or ii) a COT duration value, indicating a number of sidelink slots being shared; and
  operate the first communications device to transmit one or more physical sidelink control channel (PSCCH) signals to a second communications device, said one or more PSCCH signals communicating at least some of the determined COT sharing information, said transmitted one or more PSCCH signals communicating the multi-bit channel access priority class value and the COT duration value.

14. The first communications device of claim 13, wherein said determined COT sharing information corresponds to a sidelink channel in unlicensed spectrum.

15. The first communications device of claim 13, wherein said multi-bit channel access priority class value indicates a channel priority access class of the first communications device.

16. The first communications device of claim 15, wherein said multi-bit channel access priority class value is a two bit value.

17. The first communications device of claim 16, wherein the COT duration value includes more bits than the multi-bit channel access priority class value.

18. A first communications device, comprising:
a wireless transmitter; and
a processor configured to:
  determine channel occupancy time (COT) sharing information including at least a multi-bit channel access priority class value indicating a channel priority class of the first communications device; and
  operate the first communications device to transmit one or more physical sidelink control channel (PSCCH) signals to a second communications device, said one or more PSCCH signals communicating determined COT sharing information, said determined COT sharing information communicating the multi-bit channel access priority class value and further including a COT sharing indicator value.

19. The first communications device of claim 18, wherein said processor is further configured to:
  operate the first communications device to transmit physical sidelink shared channel (PSSCH) signals communicating traffic data to the second communications device during a first portion of the COT.

20. A non-transitory computer readable medium including machine executable instructions, which when executed by a processor of a first communications device, control the first communications device to perform the steps of:
  determining channel occupancy time (COT) sharing information including at least: i) a multi-bit channel access priority class value and ii) a COT duration value, indicating a number of sidelink slots being shared; and
  transmitting one or more physical sidelink control channel (PSCCH) signals to a second communications device, said one or more PSCCH signals communicating at least some of the determined COT sharing information, said transmitted one or more PSCCH signals communicating the multi-bit channel access priority class value and the COT duration value.

* * * * *